(12) United States Patent
Hirata et al.

(10) Patent No.: US 8,054,570 B2
(45) Date of Patent: *Nov. 8, 2011

(54) RECORDING HEAD AND DATA RECORDING AND REPRODUCING APPARATUS

(75) Inventors: Masakazu Hirata, Chiba (JP); Manabu Oumi, Chiba (JP); Majung Park, Chiba (JP)

(73) Assignee: Seiko Intstruments Inc. (JP)

( * ) Notice: Subject to any disclaimer, the term of this patent is extended or adjusted under 35 U.S.C. 154(b) by 97 days.

This patent is subject to a terminal disclaimer.

(21) Appl. No.: 12/312,614

(22) PCT Filed: Nov. 9, 2007

(86) PCT No.: PCT/JP2007/071746
§ 371 (c)(1),
(2), (4) Date: Jul. 7, 2009

(87) PCT Pub. No.: WO2008/062677
PCT Pub. Date: May 29, 2008

(65) Prior Publication Data
US 2010/0046111 A1    Feb. 25, 2010

(30) Foreign Application Priority Data

Nov. 20, 2006 (JP) .................. 2006-313200
Feb. 8, 2007 (JP) .................. 2007-029070
Sep. 4, 2007 (JP) .................. 2007-228758

(51) Int. Cl.
*G11B 5/02* (2006.01)

(52) U.S. Cl. .................. 360/59; 360/110; 360/234.3

(58) Field of Classification Search .................. None
See application file for complete search history.

(56) References Cited

U.S. PATENT DOCUMENTS

| | | | |
|---|---|---|---|
| 6,700,838 B1 * | 3/2004 | McDaniel | 369/13.13 |
| 6,795,630 B2 * | 9/2004 | Challener et al. | 385/129 |
| 7,412,143 B2 * | 8/2008 | Rottmayer et al. | 385/129 |
| 7,599,277 B1 * | 10/2009 | Kato et al. | 369/112.27 |
| 7,773,342 B2 * | 8/2010 | Shimazawa et al. | 360/125.33 |
| 2003/0142597 A1 * | 7/2003 | Park et al. | 369/44.23 |

FOREIGN PATENT DOCUMENTS

| | | |
|---|---|---|
| JP | 2005004901 | 1/2005 |
| WO | 0028536 | 5/2000 |

* cited by examiner

*Primary Examiner* — Jason Olson
(74) *Attorney, Agent, or Firm* — Adams & Wilks

(57) ABSTRACT

A recording head includes a slider, and a recording element fixed to a side surface of the slider on the side of an outflow end and having a main magnetic pole and an auxiliary magnetic pole which generate a recording magnetic field. A spot light generating element includes a core having a reflecting surface that reflects a luminous flux introduced from one end side to the other end side in a direction different from the direction of introduction and a luminous flux condensing unit configured to generate a spot light by propagating the reflected luminous flux to the other end side while condensing the same, and a clad configured to confine the core in the interior thereof. The spot light generating element is fixed adjacently to the recording element in a state in which the other end side is faced toward a magnetic recording medium. A luminous flux guide is arranged in parallel with the slider and allows the luminous flux to be introduced from the one end side into the core whereby the luminous flux condensing unit generates a spot light in the vicinity of the main magnetic pole.

7 Claims, 19 Drawing Sheets

RECORDING HEAD AND DATA RECORDING AND REPRODUCING APPARATUS

CROSS-REFERENCE TO RELATED APPLICATIONS

This application is a U.S. national stage application of International Application No. PCT/JP2007/071746 filed Nov. 9, 2007, claiming an earliest priority date of Nov. 20, 2006, and published in a non-English language.

TECHNICAL FIELD

The present invention relates to a recording head configured to record various data in a magnetic recording medium utilizing a spot light obtained by condensing a light, and a data recording and reproducing apparatus having the recording head.

BACKGROUND ART

In recent years, the recording density of data in a single recording plane is increased in association with increase in capacity of a hard disk or the like in computer equipment. For example, in order to increase the recording capacity per unit area of a magnetic disc, it is necessary to increase the surface recording density. However, in association with increase in recording density, the recording area per one bit on a recording medium is reduced. When the bit size is reduced, the energy possessed by one bit data becomes close to the heat energy of ambient temperatures, and hence a problem of heat demagnetization such as recorded data is inverted or lost due to heat fluctuations or the like arises.

Although a generally used in-plane recording system is a system to record magnetism so as to cause the direction of magnetization to direct toward the in-plane direction of the recording medium, with this system, the above-described loss of the recorded data or the like due to the heat demagnetization is apt to occur. Therefore, in order to solve such inconveniences, it is in the course of transferring to a vertical recording system which records magnetizing signals in the direction vertical to the recording medium. This system is a system in which magnetic data is recorded on the basis of a principle to bring a single magnetic pole to the recording medium. According to this system, a recording magnetic field is directed substantially vertical to a recording film. Data recorded in the vertical magnetic field is easy to maintain its energetic stability since an N-pole and an S-pole can hardly generate a loop in the recording film plane. Therefore, this perpendicular recording system is resistive against the heat demagnetization in comparison with the in-plane recording system.

However, the recording medium in recent years is required to have a higher density in response to a need such that recording and reproduction of a larger amount of higher density data or the like is desired. Therefore, the recording medium having a higher coercivity are started to be employed in order to minimize influences between adjacent magnetic domains or the heat fluctuations. Therefore, even with the above-described perpendicular recording system, recording of data in the recording medium becomes difficult.

Therefore, in order to solve this inconvenience, a hybrid magnetic recording system in which the magnetic domain is locally heated using a spot light obtained by condensing a light or a near field light to lower the coercivity temporarily to allow writing during this period is proposed. In particular when using the near field light, handling of optical data in an area not exceeding the wavelength of the light, which has been considered to be limited in the optical system in the related art, is enabled. Therefore, high-density of a recording bit exceeding the light data recording and reproducing apparatus or the like in the related art is achieved.

Although various types of writing heads on the basis of the hybrid magnetic recording system described above are provided, as one of those, a near field optical head in which heating is performed utilizing the near field light is known (for example, see JP-A-2004-158067 and JP-A-2005-4901).

This near field optical head mainly includes a main magnetic pole, an auxiliary magnetic pole (return pole), a coil winding having a helical conductive pattern formed in the interior of an insulator, a metal scatterer configured to generate a near field light from an irradiated laser beam, a plane laser light source configured to irradiate the metal scatterer with the laser beam, and a lens configured to focus the irradiated laser beam. These respective components are attached to a side surface of a slider fixed to a distal end of the beam.

The main magnetic pole has a surface opposing the recording medium on one end side, and is connected to the auxiliary magnetic pole on the other end side. In other words, the main magnetic pole and the auxiliary magnetic pole constitute a single magnetic poly type vertical head having one magnetic pole (single magnetic pole) arranged in the vertical direction. The coil winding is fixed to the auxiliary magnetic pole in such a manner that part of it passes between the magnetic pole and the auxiliary magnetic pole. The magnetic pole, the auxiliary magnetic pole, and the coil winding as described above constitute an electromagnet as a whole.

The above-described metal scatterer formed of gold or the like is attached to a distal end of the main magnetic pole. The above-described plane laser light source is arranged at a position apart from the metal scatterer and the above-described lens is arranged between the plane laser light source and the metal scatterer.

The respective components as described above are attached in the order of the auxiliary magnetic pole, the coil winding, the main magnetic pole, the metal scatterer, the lens, and the plane laser light source in sequence from the side of the side surface of the slider.

When utilizing the near field optical head configured in this manner, various data are recorded in the recording medium by applying the recording magnetic field simultaneously with the generation of the near field light.

In other words, the laser beam is applied from the plane laser light source. This laser beam is focused by the lens and is applied on the metal scatterer. Then, since free electrons in the interior of the metal scatterer are uniformly oscillated by the electric field of the laser beam, a plasmon is excited so that the near field light is generated at a distal end portion. Consequently, a magnetic recording layer of the recording medium is locally heated by the near field light, and the coercivity is temporarily lowered.

Also, by supplying a drive current to the conductive pattern of the coil winding simultaneously with the above-described laser beam irradiation, the recording magnetic field is locally applied on the magnetic recording layer of the recording medium close to the main magnetic pole. Accordingly, recording of various data in the magnetic recording layer in a state in which the coercivity is temporarily lowered is achieved. In other words, the recording in the recording medium is achieved in cooperation between the near field light and the magnetic field.

[Patent Document 1] JP-A-2004-158067
[Patent Document 2] JP-A-2005-4901

DISCLOSURE OF INVENTION

Problems to be Solved by the Invention

However, the near field optical head in the related art as described above still has the following problem.

In other words, when generating the near field light which is inevitable in data recording, the metal scatterer is irradiated with the laser beam from the plane laser light source via the lens while being condensed. However, since the metal scatterer is attached to the distal end of the main magnetic pole, the laser beam is obliged to be applied from the plane laser light source with the optical axis thereof inclined obliquely. Therefore, even when the lens position is successfully adjusted, it is difficult to condense the laser beam on the metal scatterer with a high degree of efficiency. In particular, since the lens is needed to be arranged while considering interference with the recording medium, the one having a semi-circular shape is used, which is also a factor which lowers the light condensing efficiency.

Consequently, the near field light cannot be generated with a high degree of efficiency, and there might be a case where writing of data cannot be achieved.

Also, since the lens is needed to be arranged at a position apart from the metal scatterer, the size of the head is increased, and a compact configuration cannot be achieved. In addition, since a plane laser light source is needed to be arranged while considering the position of the lens and the position of the metal scatterer, installation is not easy.

Means for Solving the Problems

In view of such circumstances, it is an object of the present invention to provide a recording head which is able to condense a luminous flux with a high degree of efficiency to improve the writing reliability, is compact, and is able to be reduced in thickness, and a data recording and reproducing apparatus having the recording head.

In order to solve the problems as described above, the present invention provides following means.

A recording head according to the present invention is a recording head configured to record data by heating a magnetic recording medium which rotates in a constant direction by a spot light generated by condensing a luminous flux and causing a flux reversal by providing a recording magnetic field in the vertical direction with respect to the magnetic recording medium, including: a slider arranged so as to oppose a surface of the magnetic recording medium; a recording element fixed to a distal end surface of the slider and having a main magnetic pole and an auxiliary magnetic pole for generating the recording magnetic field; a spot light generating element including: a core having a reflecting surface configured to reflect the luminous flux introduced from one end side to the other end side in a direction different from the direction of introduction, and a luminous flux condensing unit formed by drawing(narrowing) in such a manner that a cross-sectional area orthogonal to a direction from the one end side to the other end side is gradually reduced and configured to generate the spot light by propagating the reflected luminous flux toward the other end side while condensing the same and emit the spot light from the other end side toward an outside; and a clad(cladding) formed of a material having a lower index of refraction than that of the core and configured to confine the core in the interior thereof by coming into tight contact with a side surface of the core while exposing the other end side of the core to the outside, and being fixed to adjacently to the recording element in a state in which the other end side is directed toward the magnetic recording medium; and luminous flux introducing means fixed to the slider in a state of being arranged in parallel to the slider and configured to introduce the luminous flux into the core from the one end side, in which the luminous flux condensing unit generates the spot light in the vicinity of the main magnetic pole.

In the recording head according to the present invention, data recording in the rotating magnetic recording medium may be achieved by a hybrid magnetic recording system in which a spot light generating in the spot light generating element and a recording magnetic field generated in the recording element are cooperated.

First of all, the slider is arranged in the state of being opposed to the surface of the magnetic recording medium. Then, the recording element having the main magnetic pole and the auxiliary magnetic pole is fixed to the distal end surface of the slider. Furthermore, the spot light generating element is fixed adjacently to the recording element. In other words, arranged on the distal end surface of the slider are the recording element, and the spot light generating element in sequence from the side of the slider. The spot light generating element is fixed in the state in which the other end side where the spot light is generated is directed toward the magnetic recording medium side. Therefore, the one end side where the luminous flux is introduced is positioned apart from the magnetic recording medium. Then, the luminous flux introducing means fixed to the slider is connected to the one end side.

When recording here, the luminous flux is introduced into the core of the spot light generating element from the luminous flux introducing means. In this case, the luminous flux is introduced in the direction parallel to the slider. Then, the introduced luminous flux is reflected on the reflecting surface, and is changed in direction to a direction different from the direction of introduction. In other words, the luminous flux is bent in direction by substantially 90 degrees by the reflecting surface, and is directed to the other end side positioned on the side of the magnetic recording medium. Then, the luminous flux is propagated in the luminous flux condensing unit toward the other end side.

In this case, the luminous flux condensing unit is drawn in such a manner that the cross-sectional area orthogonal to the longitudinal direction extending from the one end side to the other end side is gradually reduced. Therefore, the luminous flux is gradually condensed while repeating the reflection from the side surface when passing through the luminous flux condensing unit, and is propagated in the interior of the core. In particular, since the clad is in tight contact with the side surface of the core, the light is not leaked to the outside the core. Therefore, the introduced luminous flux is propagated to the other end side while reducing the diameter of the same without waste.

Therefore, the luminous flux is reduced into a small spot size at a time point when it reaches the other end side of the luminous flux condensing unit. In other words, the luminous flux condensing unit is able to reduce the spot size of the introduced luminous flux to a small size. Accordingly, the spot light may be generated, and may be emitted from the other end side to the outside.

Then, the magnetic recording medium is locally heated by the spot light, and the coercivity is temporarily lowered. In particular, since the luminous flux condensing unit generates the spot light in the vicinity of the main magnetic pole, the coercivity of the magnetic recording medium may be lowered at a position as close to the main magnetic pole as possible.

In contrast, simultaneously with the introduction of the luminous flux as described above, the recording element is activated to generate a recording magnetic field between the main magnetic pole and the auxiliary magnetic pole. Accordingly, the recording magnetic field may be generated on a pinpoint local position of the magnetic recording medium where the coercivity is lowered by the spot light. The direction of this recording magnetic field is changed according to the data to be recorded. Then, the direction of magnetization of the magnetic recording medium is changed to the vertical direction according to the direction of the recording magnetic field upon reception of the recording magnetic field. Consequently, the recording of the data is achieved.

In other words, the recording of the data is achieved by the hybrid magnetic recording system in which the spot light and the recording magnetic field are cooperated. Since a vertical magnetic recording system is employed, a stable recording with a high writing reliability is achieved without being affected by the phenomenon of the heat fluctuations.

In particular, the spot light may be generated by reflecting the luminous flux on the reflecting surface, and then directing the same from an upper surface side of the slider to the other end side in the direction toward the magnetic recording medium while condensing along a substantially rectilinear optical axis, the optical axis is not inclined as in the related art, and the lens which is difficult to adjust the position is not necessary. Therefore, the spot light may be generated by condensing the luminous flux with a high degree of efficiency, so that the magnetic recording medium may be heated with a high degree of efficiency. Therefore, improvement of the writing reliability is achieved.

In addition, since the coercivity of the magnetic recording medium may be lowered in the vicinity of the main magnetic pole, a peak position of the heating temperature may be set to a position where the recording magnetic field locally acts. Therefore, the recording is achieved further reliably, and the higher density recording is enabled.

Also, since the luminous flux is introduced by utilizing the luminous flux inducing means and, in addition, is propagated in the core, the luminous flux is not propagated in air as in the related art. Therefore, a light guide loss may be minimized. Also, since the spot light generating element may be configured with the core and the clad, simplification of the configuration is achieved. Furthermore, since the recording element and the spot light generating element are arranged in sequence on a side surface on the side of an outflow end of the slider, the possibility of overlapping of the respective components other than the luminous flux introducing means in the direction of thickness of the slider is minimized. Therefore, reduction in thickness in a compact design is achieved. In addition, since the luminous flux is introduced reliably via the luminous flux inducing means, a light source for generating the luminous flux may be arranged easily.

As described above, according to the recording head in the present invention, the spot light may be generated by condensing the luminous flux with a high degree of efficiency, so that the writing reliability is improved. Also, a compact design and reduction in thickness are achieved.

The recording head according to the present invention is, in the recording head according to the present invention as described above, characterized in that the clad is formed in a state of exposing one end side of the core to the outside.

In the recording head according to the present invention, since the clad is formed in the state in which the one end side of the core is exposed to the outside, the luminous flux may be introduced directly into the core without the intermediary of the clad. Therefore, the spot light may be generated with a higher degree of efficiency, so that the magnetic recording medium may be heated more.

The recording head according to the present invention is, in the recording head according to the present invention as described above, characterized in that the luminous flux condensing unit includes a near field light generating element configured to generate a near field light from the spot light and emit the near field light from the other end side to the outside.

In the recording head according to the present invention, since the near field light generating element is provided in the luminous flux condensing unit, the luminous flux is condensed to the spot light, and then to the near field light by further reducing the spot size. Therefore, the magnetic recording medium may be heated in a further minute area, so that the recording at the higher density is achieved.

The recording head according to the present invention is, in any one of the recording heads according to the present invention as described above, characterized in that a reproducing element configured to output an electric signal according to the magnitude of a magnetic field leaked from the magnetic recording medium is provided.

In the recording head according to the present invention, the reproducing element outputs the electric signal according to the magnitude of the magnetic field leaked from the magnetic recording medium. Therefore, reproduction of data recorded in the magnetic recording medium from the electric signal outputted from the reproducing element is achieved.

The recording head according to the present invention is, in the recording head according to the present invention as described above, characterized in that the reproducing element is provided between the slider and the recording element.

In the recording head according to the present invention, since the reproducing element is provided between the slider and the recording element, the reproducing element, the recording element, and the spot light generating element are arranged in sequence from the distal end side of the slider. Therefore, even when the slider which is arranged so as to oppose the surface of the magnetic recording medium is inclined with the distal end surface being faced toward the magnetic recording medium, the recoding element and the spot light generating element may be brought to a position as close to the magnetic recording medium as possible. Therefore, the spot light and the recording magnetic field may be caused to act on the magnetic recording medium with a high degree of efficiency, so that the higher density recording is achieved.

The recording head according to the present invention is, in the recording head according to the present invention as described above, characterized in that the reproducing element is provided in a state of being embedded in the clad.

In the recording head according to the present invention, since the reproducing element is embedded in the clad in which the core is confined in the interior thereof, the thickness of the reproducing element may be absorbed by the clad. Therefore, the slider arranged so as to oppose the surface of the magnetic recording medium is inclined in a state in which the distal end surface is faced toward the magnetic recording medium, the recording element and the spot light generating element may be brought to a position as close to the magnetic recording medium as possible. Therefore, the spot light and the recording magnetic field may be caused to act on the magnetic recording medium with a higher degree of efficiency, so that the higher density recording is achieved.

A data recording and reproducing apparatus according to the present invention includes: any one of recording heads according to the present invention as described above; a beam configured to be movable in a direction parallel to a surface of the magnetic recording medium and support the recording head at a distal end side in a state of being rotatable about two axes extending in parallel to the surface of the magnetic recording medium and being orthogonal to each other; a light source configured to enter the luminous flux to the luminous flux introducing means; an actuator configured to support a proximal end side of the beam and move the beam toward the direction parallel to the surface of the magnetic recording medium; a rotation driving unit configured to rotate the magnetic recording medium in the constant direction; and a control unit configured to control operations of the recording element and the light source.

In the data recording and reproducing apparatus according to the present invention, the magnetic recording medium is rotated in the constant direction by the rotation driving unit, and then the beam is moved by the actuator to cause the recording head to scan. Then, the recording head is arranged at a desired position on the magnetic recording medium. In this case, the recording head is supported by the beam in the state of being rotatable about the two axes extending in parallel to the surface of the magnetic recording medium and being orthogonal to each other, that is, so as to be twisted about the two axes. Therefore, even when a wave is generated in the movement of the magnetic recording medium, a change in wind pressure caused by such wave or a change of the wave which is directly transmitted may be absorbed by the twisting, so that the posture of the recording head may be stabilized.

Subsequently, the control unit activates the recording element and the light source. Accordingly, the recording head causes the spot light and the recording magnetic field to cooperate with each other so that the recording of the data in the magnetic recording medium is achieved. In particular, since the recording head as described above is provided, the writing reliability is high, and the high density recording is supported, whereby the high quality is achieved. Also, a compact design and reduction in thickness are simultaneously achieved.

BEST MODES FOR CARRYING OUT THE INVENTION

First Embodiment

Referring now to FIG. 1 to FIG. 6, a first embodiment of a recording head, and a data recording and reproducing apparatus according to the present invention will be described. A data recording and reproducing apparatus 1 in this embodiment is an apparatus configured to write in a perpendicular recording system in a disc (magnetic recording medium) D having a vertical recording layer d2. In this embodiment, an air floating type in which a print head 2 is floated utilizing a flow of air generated by the rotation of the disc D will be exemplified for description.

Figure 1:
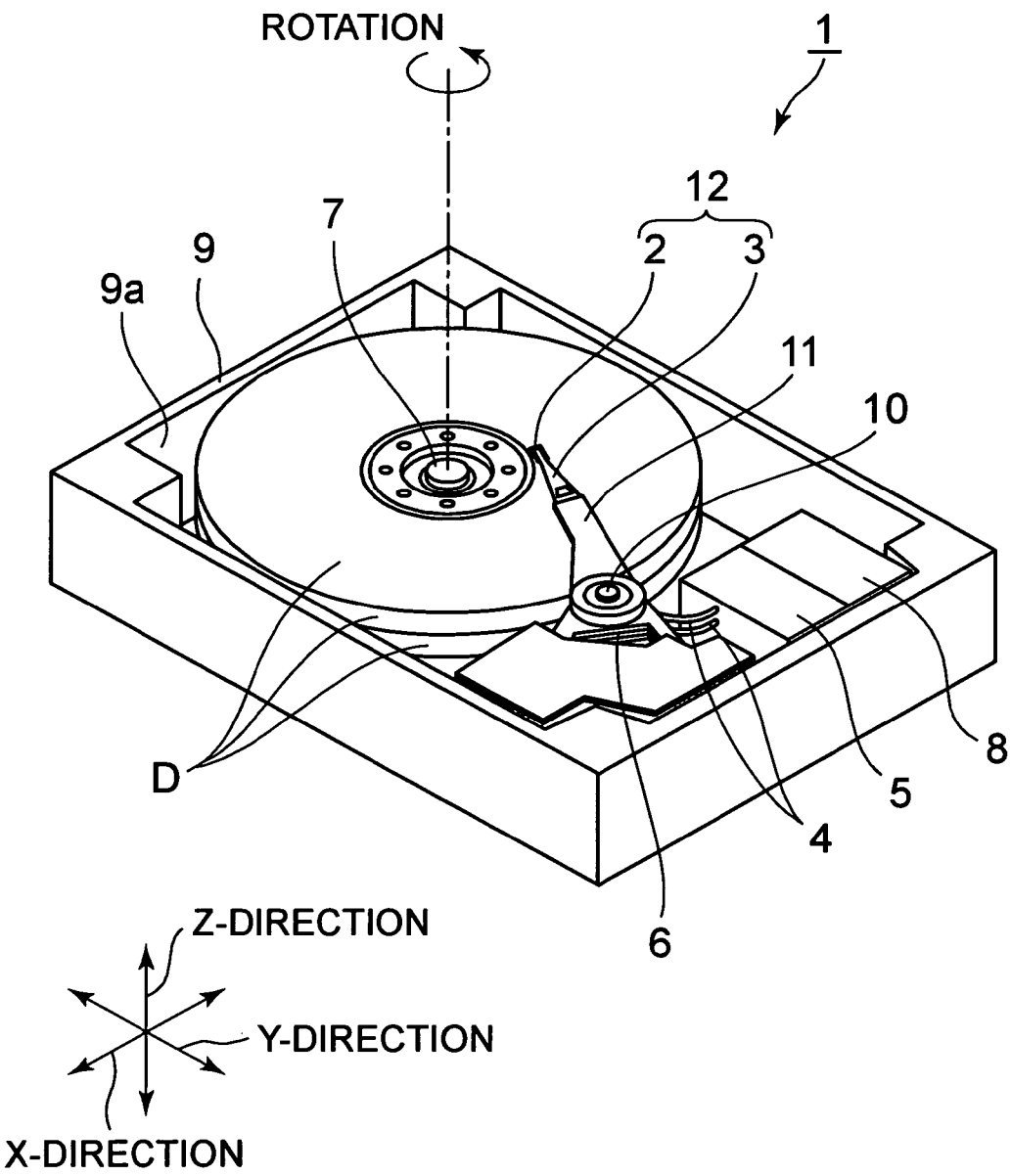
FIG. 1 is a configuration drawing showing a first embodiment of a data recording and reproducing apparatus having a recording head according to the present invention.

The data recording and reproducing apparatus 1 in this embodiment includes, as shown in FIG. 1, the recording head 2 having a spot size converter (spot light generating element) 22, described later, a beam 3 configured to be movable in a XY-direction which is parallel to a disc surface (surface of the magnetic recording medium) D1 and to support the recording head 2 at a distal end side in a state of rotatable about two axes (X-axis and Y-axis) extending in parallel with the disc surface D1 and being orthogonal two each other, an optical signal controller (light source) 5 configured to allow a luminous flux L to enter from a proximal end side of a light guide (luminous flux introducing means) 4 into the light guide 4, an actuator 6 configured to support a proximal end side of the beam 3 and move the beam 3 in the XY-direction extending in parallel to the disc surface D1 for scanning, a spindle motor (rotary driving unit) 7 configured to rotate the disc D in a constant direction, a control unit 8 configured to control operations of a recording element 21 and the optical signal controller 5 described later, and a housing 9 configured to store these components respectively in the interior thereof.

The housing 9 is formed of a metallic material such as aluminum into a square prism shape in top view, and is formed with a recessed portion 9a for storing respective components in the inside thereof. The housing 9 is configured in such a manner that a lid, not shown, is detachably fixed so as to close an aperture of the recessed portion 9a.

The above-described spindle motor 7 is attached to a substantially center of the recessed portion 9a, and the disc D is detachably fixed by fitting a center hole on the spindle motor 7. The above-described actuator 6 is attached to a corner portion of the recessed portion 9a. A carriage 11 is mounted to the actuator 6 via a bearing 10, and the beam 3 is attached to a distal end of the carriage 11. Then, the carriage 11 and the beam 3 are movable in the above-described XY-direction together by an activation of the actuator 6.

The carriage 11 and the beam 3 are configured to retract from above the disc D by the activation of the actuator 6 when the rotation of the disc D is stopped. Also, the recording head 2 and the beam 3 constitute a suspension 12. The optical signal controller 5 is mounted in the recessed portion 9a adjacently to the actuator 6. The above-described control unit 8 is mounted adjacently to the actuator 6.

The above-described recording head 2 is configured to record data by heating the rotating disc D by a spot light R generated by condensing a luminous flux L, and generating a flux reversal by providing the disk D with a vertical recording magnetic field.

Figure 2:
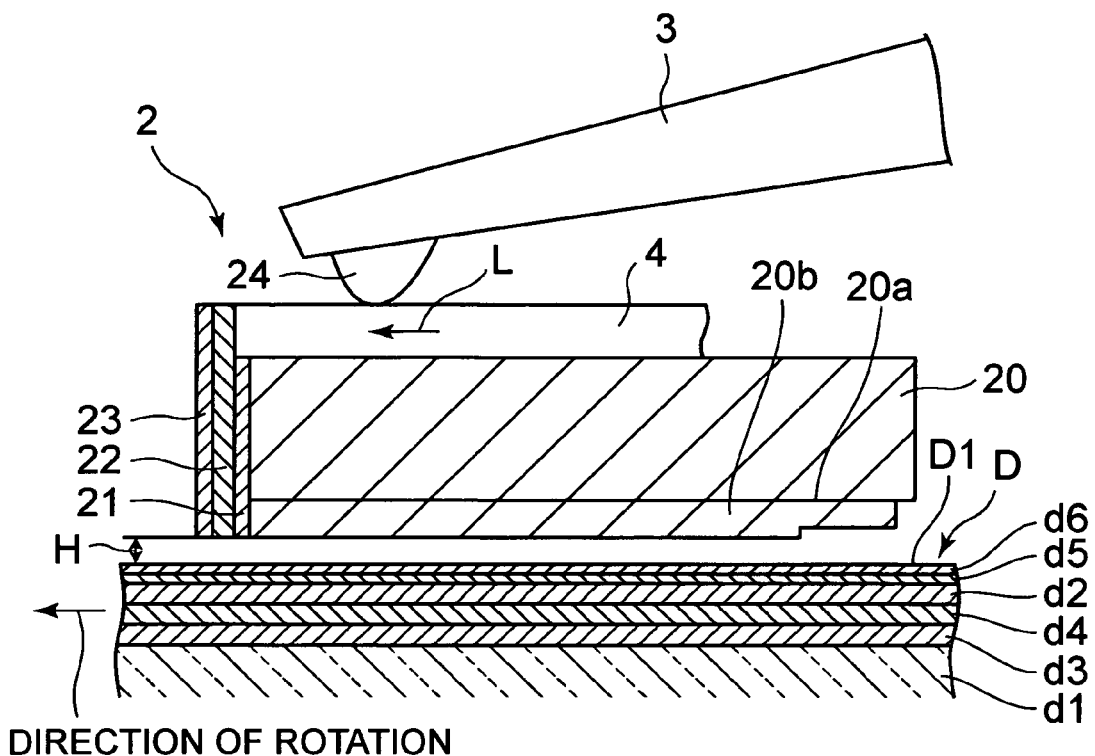
FIG. 2 is an enlarged cross-sectional view of the recording head shown in FIG. 1.
Figure 2:
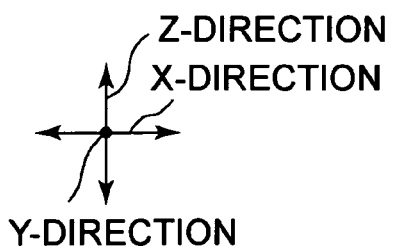
Figure 3:
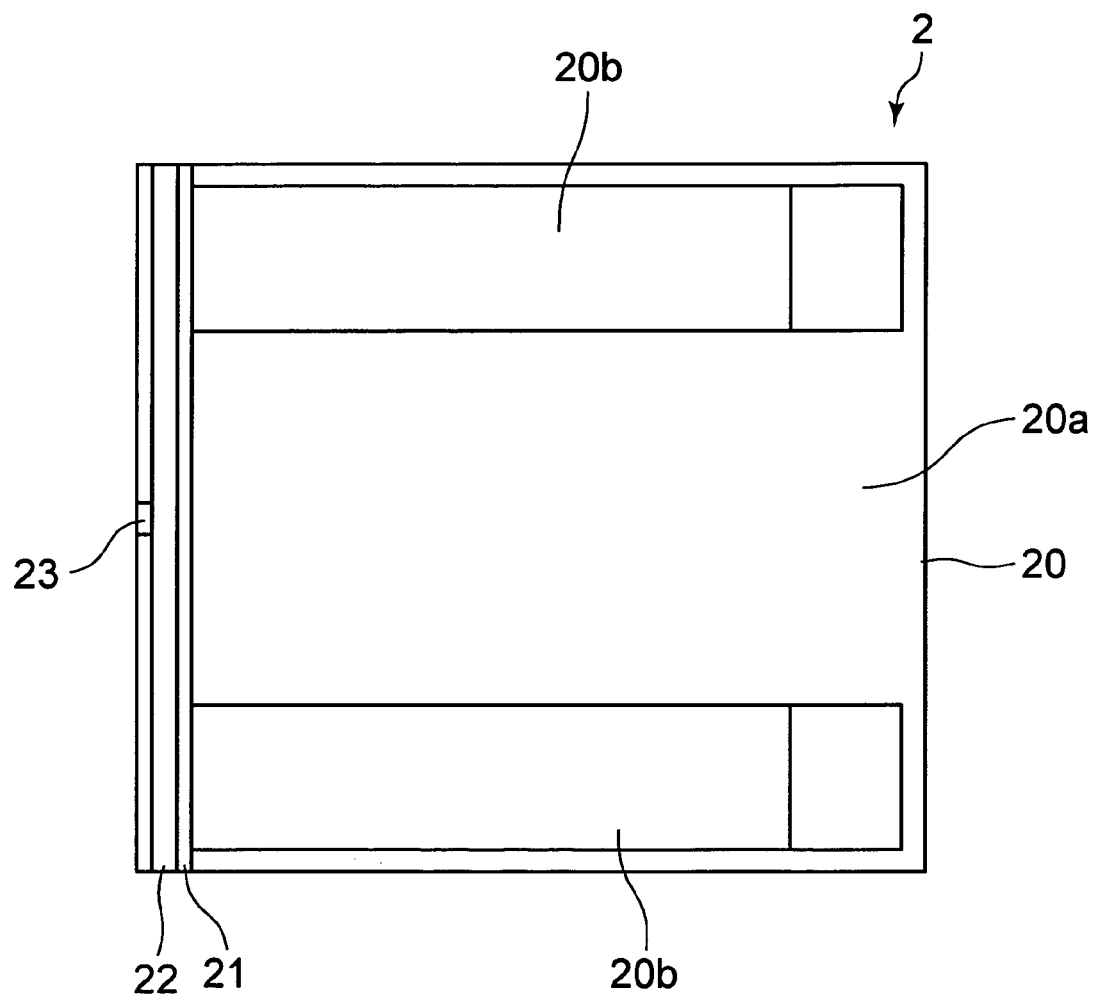
FIG. 3 is a drawing showing the recording head shown in FIG. 2 viewed from the side of a disc surface.

The recording head 2 includes, as shown in FIG. 2 and FIG. 3, a slider 20 being arranged so as to oppose the disc D in a state of being floated from the disc surface D1 by a predetermined distance H and having an opposed surface 20a opposing the disc surface D1, a recording element 21 fixed to a distal end surface of the slider 20 (hereinafter, referred to as a side surface on the side of an outflow end), the spot size converter 22 fixed adjacently to the recording element 21, and the light guide 4 configured to introduce the luminous flux L from the optical signal controller 5 into a core 40, described later, of the spot size converter 22. The recording head 2 in this embodiment is provided with a reproducing element 23 fixed adjacently to the spot size converter 22.

The above-described slider 20 is formed of light-transmitting materials such as quartz glass or ceramic or the like such as AlTiC (altic) into a parallelepiped shape. This slider 20 is supported so as to be suspended from a distal end of the beam 3 via a gimbal unit 24 with an opposed surface 20a faced toward the disc D. The gimbal unit 24 is a member limited in movement so as to be displaced only about the X-axis and about the Y-axis. Accordingly, the slider 20 is rotatable about the two axes (X-axis, Y-axis) extending in parallel to the disc surface D1 and being orthogonal to each other as described above.

The opposed surface 20a of the slider 20 is formed with projecting ridge portions 20b for causing a pressure for floating from the viscosity of an airflow generated by the rotating disc D. In this embodiment, a case where two of the projecting ridge portions 20b extending in the longitudinal direction arranged like rails is exemplified. However, the invention is not limited to such a case, and any concavo-convex shapes are applicable as long as it is designed to float the slider 20 in an optimal state by adjusting a positive pressure to cause the slider 20 to move apart from the disc surface D1 and a negative pressure to cause the slider 20 to be attracted toward the disc surface D1. Surfaces of the projecting ridge portions 20b are surfaces referred to as ABS (Air Bearing Surface).

The slider 20 receives a force to float from the disc surface D1 by these two projecting ridge portions 20b. The beam 3 is configured to deflect in a Z-direction vertical to the disc surface D1 so as to absorb a floating force of the slider 20. In other words, the slider 20 receives a force to be pressed against the side of the disc surface D1 by the beam 3 when floated. Therefore, the slider 20 is adapted to float in a state of being apart from the disc surface D1 by the predetermined distance H as described above by a balance of the both forces. In addition, the slider 20 is configured to rotate about the X-axis and the Y-axis by the gimbal unit 24, and hence is adapted to float constantly in a stable posture.

The airflow generated in association with the rotation of the disc D flows from the side of an inflow end of the slider 20 (the proximal end side of the beam 3), flows along the ABS, and flows out from the side of the outflow end of the slider 20 (a distal end side of the beam).

Figure 4:
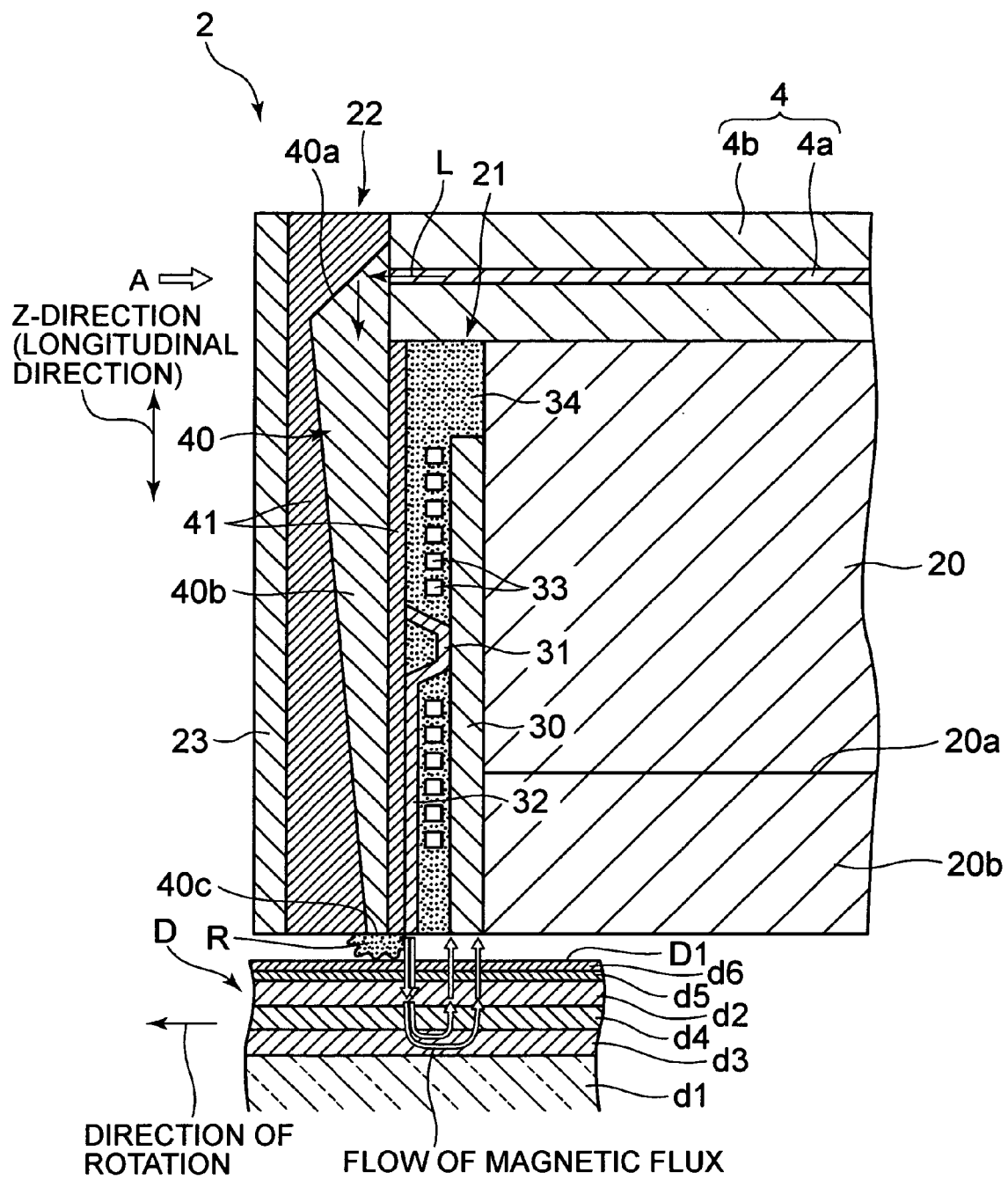
FIG. 4 is an enlarged cross-sectional view of a side surface of the recording head shown in FIG. 2 on the side of an outflow end, showing configurations of a spot light generating element and a recording element, and the relation between a spot light and a magnetic field when recording is being performed.

The above-described recording element 21 includes, as shown in FIG. 4, an auxiliary magnetic pole 30 fixed to the side surface on the side of the outflow end of the slider 20, a main magnetic pole 32 connected to the auxiliary magnetic pole 30 via a magnetic circuit 31 and configured to generate the recording magnetic field vertical to the disc D between itself and the auxiliary magnetic pole 30, and coils 33 wound around the magnetic circuit 31 about the magnetic circuit 31 in a helical pattern. In other words, the auxiliary magnetic pole 30, the magnetic circuit 31, the coil 33, and the main magnetic pole 32 are arranged in sequence from the side of the outflow end of the slider 20.

The both magnetic poles 30, 32 and the magnetic circuit 31 are formed of a high-saturated magnetic flux density (Bs) material (for example, CoNiFe alloy, CoFe alloy, and so on) having a high magnetic flux density. The coil 33 is arranged so as to have a gap between adjacent coil wires, between themselves and the magnetic circuit 31, and between the both magnetic poles 30, 32 so as to avoid a short circuit, and are molded in this state by an insulator 34. Then, the coils 33 are configured to receive a supply of the electric current modulated according to the data from the control unit 8. In other words, the magnetic circuit 31 and the coils 33 constitute an electromagnetic as a whole. The main magnetic pole 32 and the auxiliary magnetic pole 30 are designed in such a manner that end surfaces thereof opposing the disc D are flush with the ABS of the slider 20.

Figure 5:
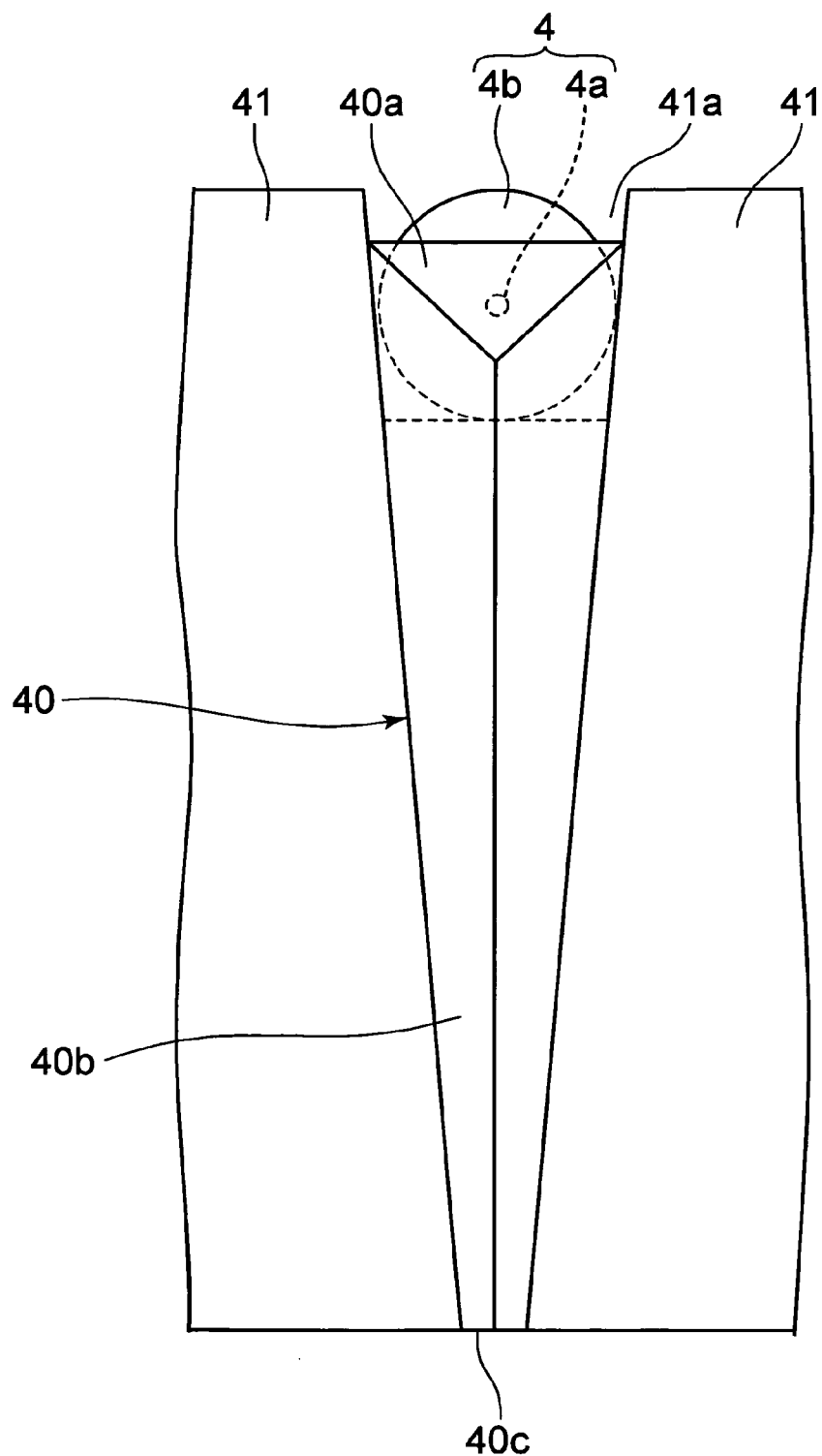
FIG. 5 is a drawing of a core of the spot light generating element shown in FIG. 4 viewed from a direction indicated by an arrow A.
Figure 6:
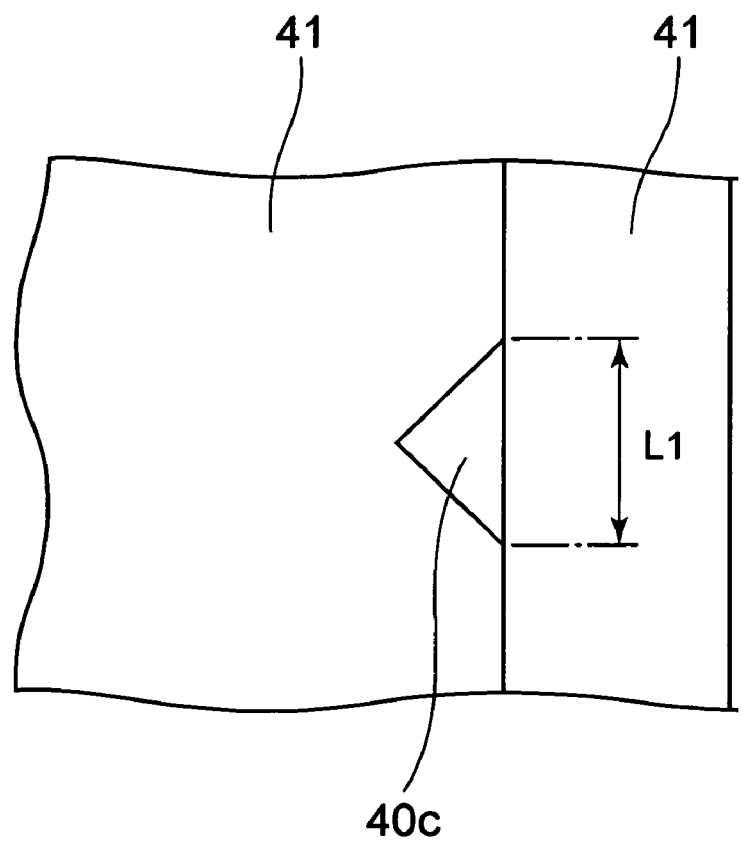
FIG. 6 is a drawing of the spot light generating element shown in FIG. 4 viewed from the side of an end surface.

As shown in FIG. 4 and FIG. 6, the above-described spot size converter 22 is fixed adjacently to the recording element 21 in a state of being directed in such a manner that one end side thereof faces upward of the slider 20, and the other end side faces toward the side of the disc D. More specifically, it is fixed adjacently to the main magnetic pole 32. FIG. 5 is a drawing of the core 40, described later, viewed in the direction of an arrow A shown in FIG. 4. Also, FIG. 6 is a drawing of the spot size converter 22 shown in FIG. 5 viewed from the side of an end surface 40c.

This spot size converter 22 is an element configured to propagate the luminous flux L introduced toward one end side while condensing the same to the other end side in a direction different from the direction of introduction, generate the spot light R and then emit the same to an outside and includes the polyhedron core 40 and a clad 41 for confining the core 40 in the interior thereof, and is formed into a substantially plate-shape as a whole.

The above-described core 40 is formed integrally of a reflecting surface 40a and a luminous flux condensing unit 40b. The reflecting surface 40a reflects the luminous flux L introduced by the light guide 4 from the one end side in a direction different from the direction of introduction. In this embodiment, the luminous flux L is reflected so as to change in direction by substantially 90 degrees.

The luminous flux condensing unit 40b is a portion drawn in such a manner that a cross-sectional area orthogonal to a longitudinal direction (Z-direction) extending from one end side to the other end side is gradually reduced, and propagates the luminous flux L reflected by the reflecting surface 40a to the other end side while condensing the same. In other words, the luminous flux condensing unit 40b is configured to reduce a spot size of the introduced luminous flux L to a small size.

In this embodiment, the luminous flux condensing unit 40b includes three side surfaces, and one of the side surfaces is arranged so as to oppose the main magnetic pole 32. Therefore, the luminous flux condensing unit 40b has the end surface 40c exposed to the outside on the other end side formed into a triangle shape as shown in FIG. 6. For reference sake, it is designed in such a manner that a maximum linear length L1 which is secured on the end surface 40c is about 1 μm. Accordingly, the spot size of the luminous flux L may be reduced to approximately the same size as the maximum linear length L1, that is, the diameter may be reduced to about 1 μm, and the luminous flux L may be emitted from the end surface 40c to the outside as the spot light R of this size. Also, the end surface 40c is designed to be flush with the ABS of the slider 20.

In this embodiment, the luminous flux condensing unit 40b is gradually drawn toward the side of the main magnetic pole 32 as shown in FIG. 4. Accordingly, the end surface 40c is positioned on the side of the main magnetic pole 32 and the spot light R of the above-described size may be generated in the vicinity of the main magnetic pole 32. The "in the vicinity" in the present invention means an area in a range apart from the main magnetic pole 32 by approximately the same distance as the diameter of the spot light R generated from the end surface 40c or a distance not exceeding this value. Therefore, in the case of this embodiment, the distance between the main magnetic pole 32 and the end surface 40c of the luminous flux condensing unit 40b is designed to be 1 μm, which is approximately the same as the diameter of the spot light R (the maximum linear length L1), or a distance not exceeding this value.

As shown in FIG. 4 and FIG. 5, the above-described clad 41 is formed of a material having a lower index of refraction than that of the core 40, and comes into tight contact with the side surface of the core 40 to confine the core 40 in the interior thereof. Therefore, it is designed so as not to generate a gap between the core 40 and the clad 41. Also, the clad 41 in this embodiment is formed so as to be able to expose the end surface 40c on the other end side to the outside in the same manner as the one end side of the core 40.

An example of a combination of materials used as the clad 41 and the core 40 will be given. For example, a combination such that the core 40 is formed of quartz ($SiO_2$), and the clad 41 is formed of quartz doped with fluorine is contemplated. In this case, when the wavelength of the luminous flux L is 400 nm, the index of refraction of the core 40 is 1.47, and the index of refraction of the clad 41 is smaller than 1.47, so that it is a preferable combination. Also, a combination such that the core 40 is formed of quartz doped with germanium and the clad 41 is formed of quartz ($SiO_2$) is also contemplated. In this case, when the wavelength of the luminous flux L is 400 nm, the index of refraction of the core 40 is larger than 1.47, and the index of refraction of the clad 41 is 1.47, so that it is a preferable combination.

In particular, the larger the difference in index of refraction between the core 40 and the clad 41 is, the larger the force to confine the luminous flux L in the core 40 becomes, so that the difference in index of refraction of the both is preferably increased by using tantalum oxide ($Ta_2O_5$; when the wavelength is 550 nm, the index of refraction is 2.16) for the core 40, and using quartz or the like for the clad 41. Also, when utilizing the luminous flux L in an infrared area, it is also effective to form the core 40 of silicon (Si: the index of refraction is about 4) as a transparent material for the infrared light.

The above-described light guide 4 is a biaxial light guide including a core 4a and a clad 4b, and is configured to allow the luminous flux L to propagate within the core 4a. The light guide 4 is fixed in a state of being fitted into a groove portion 41a formed in the clad 41 and a groove portion, not shown, formed on an upper surface of the slider 20. Accordingly, the light guide 4 is in a state of being arranged in parallel to the slider 20.

A distal end of the light guide 4 is connected to the one end side of the spot size converter 22, and introduces the luminous flux L into the core 40. The proximal end side of the light guide 4 is pulled by the optical signal controller 5 via the beam 3, the carriage 11, or the like and then is connected to the optical signal controller 5.

As shown in FIG. 5, the positional relation between the spot size converter 22 and the light guide 4 is adjusted so that the luminous flux L introduced from the light guide 4 into the core 40 enters a substantially center of the reflecting surface 40a.

The above-described reproducing element 23 is a magnetoresistive effect film configured to change in electric resistance according to the magnitude of a magnetic field leaked from the vertical recording layer d2 of the disc D. A bias current is supplied to the reproducing element 23 from the control unit 8 via a lead film or the like, not shown. Accordingly, the control unit 8 is able to detect the change of the magnetic field leaked from the disc D as the change of the voltage, so that reproduction of the signal may be performed from the change of the voltage.

The disc D used in this embodiment is a vertical two-layer film disc including at least the vertical recording layer d2 having an easy axis of magnetization in a direction vertical to the disc surface D1, and a soft magnetic layer d3 formed of a high magnetic-permeable material. As the disc D as described above, as shown in FIG. 2 for example, the one including the soft magnetic layer d3, an intermediate layer d4, the vertical recording layer d2, a protective layer d5, and a lubricant layer d6 in sequence formed on a base plate d1 is used.

The base plate d1 is, for example, an aluminum substrate, a glass substrate, or the like. The soft magnetic layer d3 is a high magnetic-permeable layer. The intermediate layer d4 is a crystal control layer of the vertical recording layer d2. The vertical recording layer d2 corresponds to a vertical anisotropic magnetic layer and, for example, a CoCrPt based alloy is used. The protective layer d5 is configured to protect the vertical recording layer d2 and, for example, a DLC (diamond like carbon) film is used. For example, a fluorine-based liquid lubrication is used as the lubricant layer d6.

Subsequently, a case of recording and reproducing the various data in and from the disk D by the data recording and reproducing apparatus 1 configured as described above will be described.

First of all, the spindle motor 7 is activated to rotate the disc D in the constant direction. Subsequently, the actuator 6 is activated to cause the beam 3 to scan in the XY-direction via the carriage 11. Accordingly, as shown in FIG. 1, the recording head 2 may be positioned at a desired position on the disc D. In this case, the recording head 2 receives a force to float by the two projecting ridge portions 20b formed on the opposed surface 20a of the slider 20 and is pressed toward the disk D by the beam 3 or the like with a predetermined force. The recording head 2 floats to a position apart from the surface of the disc D by the predetermined distance H as shown in FIG. 2 by a balance of the both forces.

Even though the recording head 2 receives a wind pressure generated by a wave of the movement of the disc D, the displacement in the Z-direction thereof is absorbed by the beam 3, and the displacement about the XY-axes is enabled by the gimbal unit 24, the wind pressure caused by the wave may be absorbed. Therefore, the recording head 2 may be floated in a stable state.

When recording the data here, the control unit 8 activates the optical signal controller 5 and supplies an electric current modulated according to the data to the coils 33, so that the recording element 2i is activated.

First of all, the optical signal controller 5 causes the luminous flux L to enter from the proximal end side of the light guide 4 upon reception of an instruction from the control unit 8. The entered luminous flux L proceeds in the core 4a of the light guide 4 to a distal end side and, as shown in FIG. 4, is introduced into the core 40 from the one end side of the spot size converter 22. In this case, the luminous flux L is introduced into the core 40 in the direction parallel to the slider 20. Then, the introduced luminous flux L is reflected on the reflecting surface 40a, and is changed in direction by substantially 90 degrees. That is, the direction is changed to a direction different from the direction of introduction. Then, the luminous flux L changed in direction is directed to the other end side located on the side of the disc D. Then, the luminous flux L is propagated in the luminous flux condensing unit 40b toward the other end side.

In this case, the luminous flux condensing unit 40b is drawn in such a manner that the cross-sectional area orthogonal to the longitudinal direction extending from the one end side to the other end side is gradually reduced. Therefore, the luminous flux L is gradually condensed while repeating the reflection from the side surface when passing through the luminous flux condensing unit 40b, and is propagated in the interior of the core 40. In particular, since the clad 41 is in tight contact with the side surface of the core 40, the light is not leaked to the outside the core 40. Therefore, the introduced luminous flux L is propagated to the other end side while condensing without waste.

Therefore, the luminous flux L is reduced into a small spot size at a time point when it reaches the other end side of the luminous flux condensing unit 40b. In other words, the luminous flux condensing unit 40b is able to reduce the spot size of the introduced luminous flux L into a small size of approximately 1 μm in diameter. Accordingly, the spot light R may be generated, and may be emitted from the end surface 40c on the other end side to the outside.

Then, the disc D is locally heated by the spot light R, and the coercivity is temporarily lowered. In particular, since the luminous flux condensing unit 40b generates the spot light R in the vicinity of the main magnetic pole 32, that is, within a range apart from the main magnetic pole 32 by approximately the same distance as the diameter of the spot light R, the coercivity of the disc D may be lowered at a position as close to the main magnetic pole 32 as possible.

In contrast, when an electric current is supplied to the coil 33 by the control unit 8, the current magnetic field generates a magnetic field in the magnetic circuit 31 on the basis of the principle of the electromagnet, and hence the recording magnetic field in the vertical direction with respect to the disc D may be generated between the main magnetic pole 32 and the auxiliary magnetic pole 30. Then, the magnetic flux generated from the side of the main magnetic pole 32 passes straight through the vertical recording layer d2 of the disc D and reaches the soft magnetic layer d3 as shown in FIG. 4. Accordingly, recording in a state in which magnetization of the vertical recording layer d2 is directed vertically with respect to the disc surface D1 is achieved. Also, the magnetic flux after having reached the soft magnetic layer d3 returns to the auxiliary magnetic pole 30 via the soft magnetic layer d3. In this case, when returning to the auxiliary magnetic pole 30, the direction of the magnetization is not affected. This is because the surface area of the auxiliary magnetic pole 30 opposing the disc surface D1 is larger than the main magnetic pole 32 and hence the density of the magnetic flux is high, so that a force as strong as inverting the magnetization is not generated. In other words, the recording is achieved only on the side of the main magnetic pole 32.

Consequently, the data recording is achieved by the hybrid magnetic recording system in which the spot light R and the recording magnetic field generated at the both magnetic poles 30, 32 are cooperated. In addition, since the recording is performed by the perpendicular recording system, a stable recording is achieved without being affected by the phenomenon of the heat fluctuations. Therefore, improvement of the writing reliability is achieved.

In particular, since the coercivity of the disc D may be lowered in the vicinity of the main magnetic pole 32, a peak position of the heating temperature may be set to a position where the recording magnetic field locally acts. Therefore, the recording is achieved reliably, improvement of the reliability is achieved, and the high density recording is enabled.

Subsequently, when reproducing the data recorded in the disc D, the reproducing element 23 fixed adjacently to the spot size converter 22 receives the magnetic field leaked from the vertical recording layer d2 of the disc D, and the electric resistance is changed according to the magnitude thereof. Therefore, the voltage of the reproducing element 23 is changed. Accordingly, the control unit 8 is able to detect the change of the magnetic field leaked from the disc D as the change of the voltage. Then, the control unit 8 reproduces the signal from the change of the voltage, so that the reproduction of the data is achieved.

In particular, according to the spot size converter 22 in this embodiment, since the spot light R may be generated by condensing from the side of the upper surface of the slider 20 to the end surface 40c on the other end side toward the disk D along the substantially rectilinear optical axis, the optical axis is not inclined as in the related art, and the lens which is difficult to adjust the position is not necessary. Therefore, the spot light R may be generated by condensing the luminous flux L with a high degree of efficiency, so that the disc D may be heated with a high degree of efficiency. Therefore, improvement of the writing reliability is achieved.

Also, in this embodiment, since the clad 41 is formed in the state in which the one end side and the other end side of the core 40 is exposed to the outside, the luminous flux L may be introduced directly into the core 40 without the intermediary of the clad 41, and the spot light R may be emitted to the outside. Therefore, the spot light R may be generated with a higher degree of efficiency, so that the disc D may be heated.

Also, since the luminous flux L is introduced by utilizing the light guide 4 and, in addition, is propagated in the core 40, the luminous flux L is not propagated in air as in the related art. Therefore, the light guide loss may be minimized. Also, the spot size converter 22 may be configured with the core 40 and the clad 41, and hence simplification of the configuration is achieved.

In addition, since the recording element 21, and the spot size converter 22 are arranged in sequence on the side surface on the side of the outflow end of the slider 20, the possibility of overlapping of the respective components other than the light guide 4 in the direction of thickness of the slider 20 is minimized. Therefore, the recording head 2 in a compact design with reduced thickness is achieved. In addition, since the luminous flux L is introduced reliably by utilizing the light guide 4, a light source for generating the luminous flux L may be arranged easily. In other words, the optical signal controller 5 may be arranged within the housing 9 which is easy to install, as shown in FIG. 1.

When manufacturing the recording head 2 in this embodiment, manufacturing is achieved by utilizing semiconductor technologies such as photolithographic technology or etching processing technology. In other words, even when the spot size converter 22 is provided, the spot size converter 22 may be manufactured simultaneously in the manufacturing process in the related art without taking a specific methodology.

More specifically, after having machined the slider 20 into a predetermined contour shape, the recording element 21 is fabricated on the side surface on the side of the outflow end of the slider 20 utilizing the above-described semiconductor technology. Then, the spot size converter 22 is fabricated on the recording element 21 utilizing the semiconductor technology in the same manner. What should be done finally is to fabricate the reproducing element 23 on the spot size converter 22. In this manner, the recording head 2 may be manufactured easily only by adding one process of manufacturing the spot size converter 22 in the process of fabricating the respective components in sequence from the side of the slider 20.

When manufacturing the spot size converter 22, first of all, the clad 41 is formed on the main magnetic pole 32. In this case, in order to connect the light guide 4 to the one end side thereof later, the clad 41 is patterned to form the groove portion 41a. Subsequently, after having formed the core 40 on the clad 41 in a protruding shape, the etching is performed as needed to form the reflecting surface 40a and the luminous flux condensing unit 40b, respectively. Then, the clad 41 is formed again to confine the core 40 in the interior thereof. Then, finally, the contour shape of the clad 41 is machined to achieve a predetermined shape. In this case, the end surface 40c may be formed by cutting the other end side of the spot size converter 22 by dicing or the like. In this manner, the spot size converter 22 may be manufactured easily by utilizing the semiconductor technology.

According to the data recording and reproducing apparatus 1 in this embodiment, since the recording head 2 as described above is provided, the writing reliability is high, and the high density recording is supported, whereby the high quality is achieved. Simultaneously, reduction of the thickness is also achieved.

Second Embodiment

Figure 7:
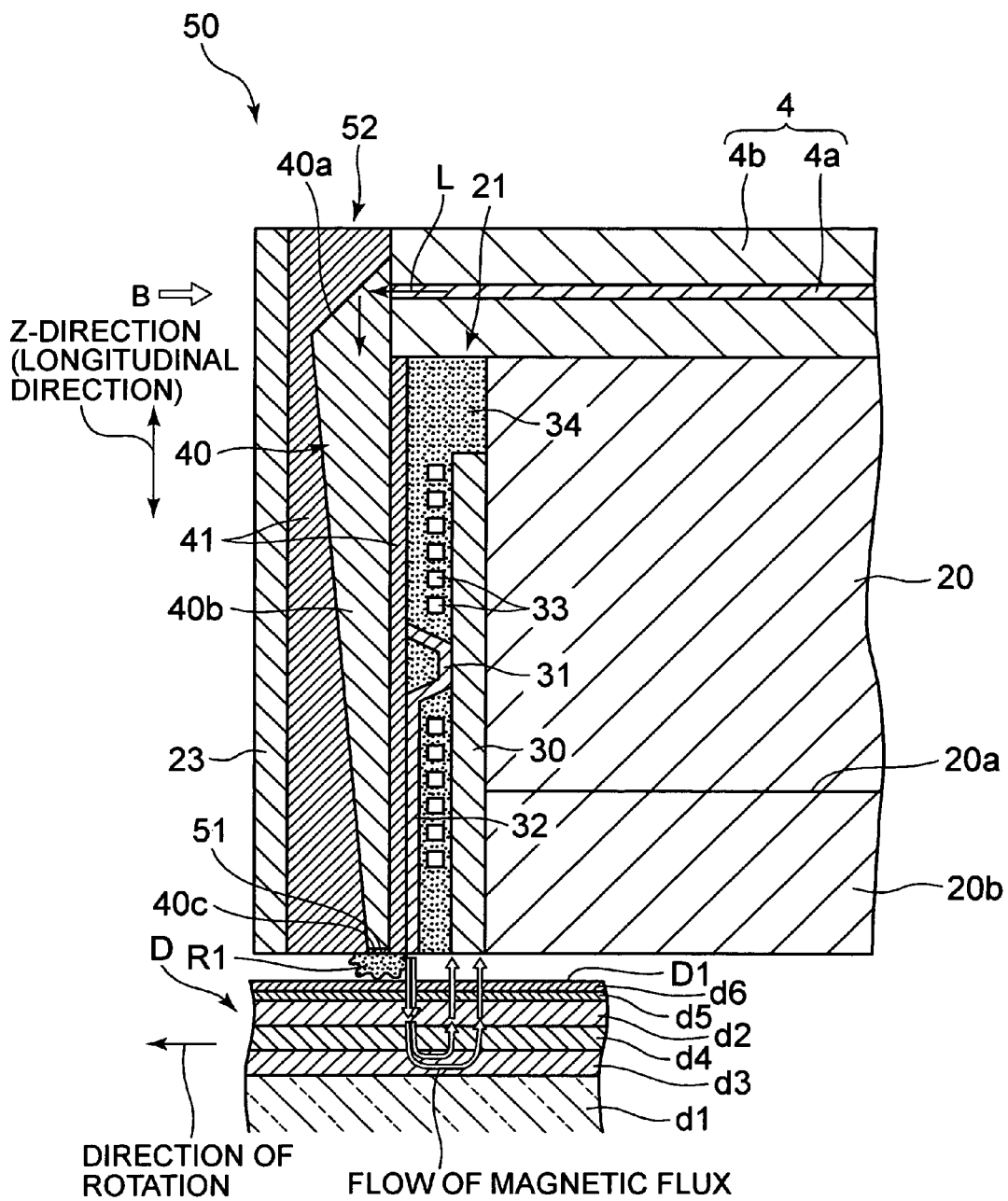
FIG. 7 is a drawing of a second embodiment of the recording head according to the present invention, showing configurations of the spot light generating element having a near field light generating element which generates a near field light and the recording element, and the relation between the near field light and the magnetic field when recording is being performed.
Figure 8:
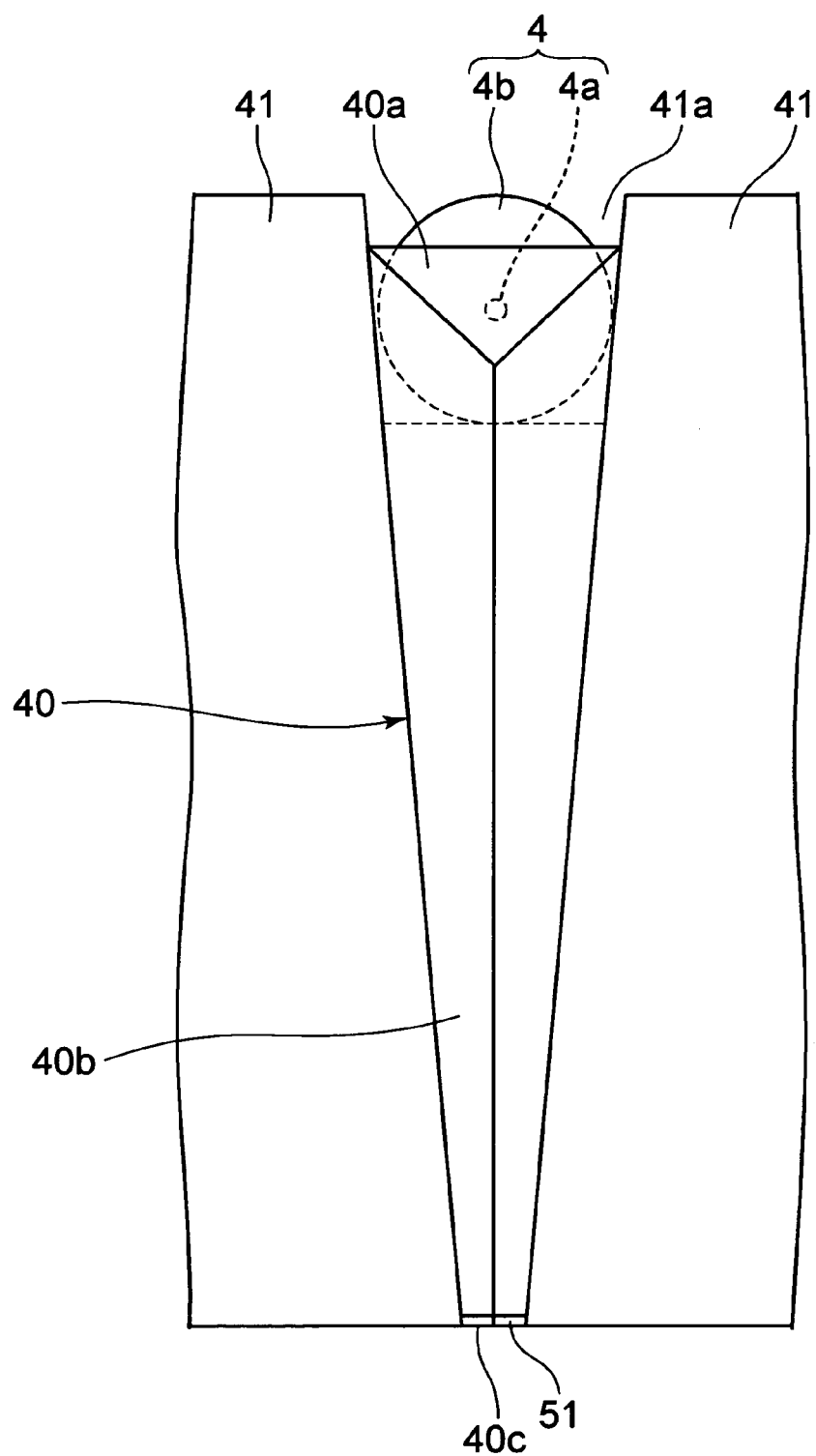
FIG. 8 is a drawing of a core of the spot light generating element shown in FIG. 7 viewed from a direction indicated by an arrow B.
Figure 9:
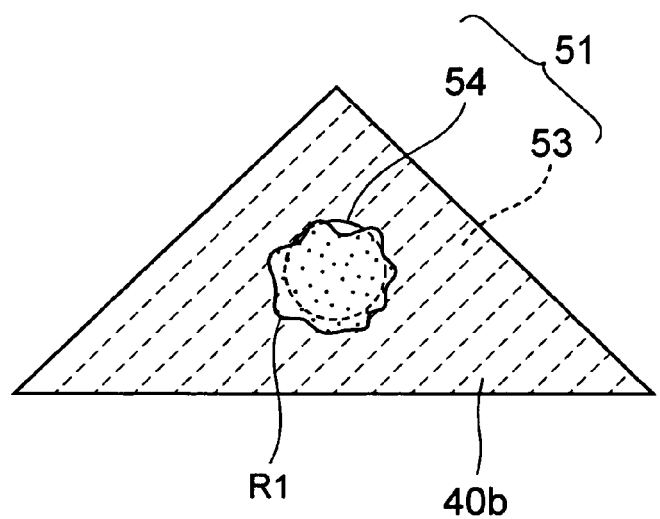
FIG. 9 is a drawing of the core shown in FIG. 8 viewed from the side of the end surface, showing a configuration of the near field light generating element.

Referring now to FIG. 7 to FIG. 9, a second embodiment of a recording head according to the present invention will be described. In this second embodiment, the same components as those in the first embodiment are designated by the same reference numerals and description thereof is omitted.

A different point of the second embodiment from the first embodiment is such that the luminous flux L is condensed to generate the spot light R, and the disc D is heated by the spot light R in the first embodiment, while the recording head 2 in the second embodiment further generates a near field light R1 from the spot light R, and heats the disc D by the near field light R1.

In other words, a recording head 50 in this embodiment includes a spot size converter (spot light generating element) 52 in which a near field light generating element 51 is provided on the luminous flux condensing unit 40b as shown in FIG. 7 and FIG. 8.

The near field light generating element 51 includes a shading film 53 formed on the end surface 40c and a minute aperture 54 formed on the shading film 53 at a substantially center thereof as shown in FIG. 9. The minute aperture 54 is a circular aperture having several tens nm to several hundreds nm, for example.

In the spot size converter 52 configured as described above, the luminous flux L is condensed to the spot light R, and then to the near field light R1 by further reducing the spot size. In other words, the luminous flux L condensed by the luminous flux condensing unit 40b in this manner passes through the minute aperture 54 and then comes out to the outside. In this case, since the spot size is further reduced by passing through the minute aperture 54, the near field light R1 is obtained. Therefore, in this case, the near field light R1 having approximately the same spot size as the minute aperture 54 is generated.

Therefore, the disc may be heated in a further minute area by the near field light R1, so that the recording at the higher density is achieved. In this case, the distance between the main magnetic pole 32 and the end surface 40c of the luminous flux condensing unit 40b might be designed to a distance of several tens nm to several hundreds nm, which is approximately the same as the diameter of the near field light R1. In this configuration, the recording magnetic field may be included reliably in the range which is heated by the near field light R1.

Figure 10:
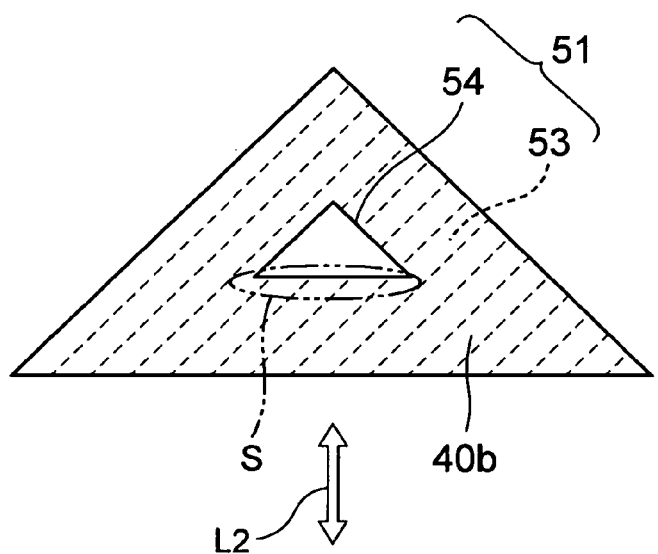
FIG. 10 is a drawing of a modification of the near field light generating element shown in FIG. 9, and is a drawing showing the near field light generating element having a minute aperture formed into a triangle shape.

Although the minute aperture 54 has a circular shape in this embodiment, the invention is not limited thereto. For example, as shown in FIG. 10, it may be the minute aperture 54 having a triangular shape. In this case as well, the near field light R1 may be generated. In particular, in this case, it is preferable to introduce the luminous flux L into the light guide 4 after having adjusted the luminous flux L so that a polarized component thereof is directed in the direction indicated by an arrow L2 shown in the drawing. In this configuration, intensive localization of the near field light R1 near one side of the minute aperture 54 (an area S shown in the drawing) is achieved. Therefore, the recording at the higher density is achieved.

Figure 11:
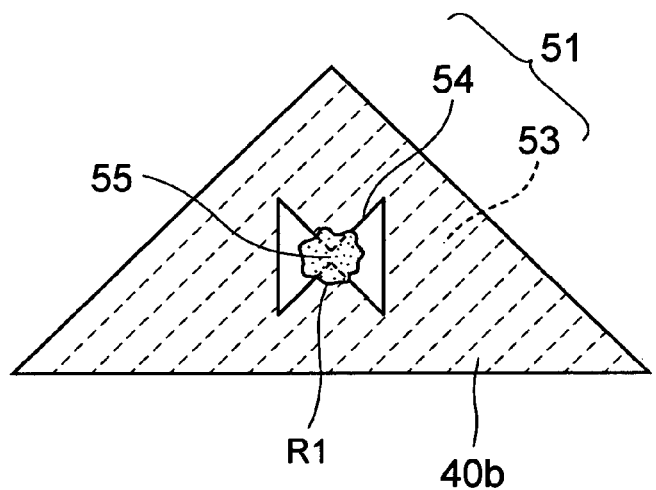
FIG. 11 is a drawing of a modification of the near field light generating element shown in FIG. 9, and is a drawing showing the near field light generating element having a minute aperture formed so that a triangle projection opposes thereto with a minute gap therebetween.

As shown in FIG. 11, the minute aperture 54 may be formed so that a triangular projection opposes thereto with a minute gap 55 formed therebetween. In this configuration, since the near field light R1 may be intensively localized to the minute gap 55, the recording at the higher density is achieved.

Figure 12:
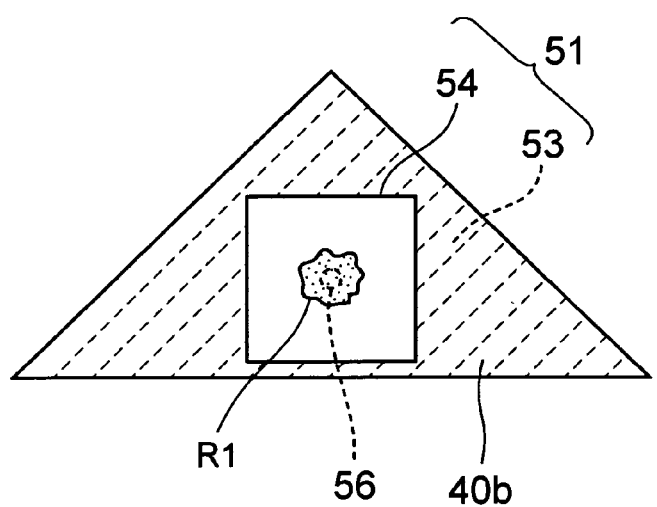
FIG. 12 is a drawing of a modification of the near field light generating element shown in FIG. 9, and is a drawing showing the near field light generating element having a minute aperture formed with a metal scatterer at a substantially center thereof.

Furthermore, as shown in FIG. 12, a minute scatterer 56 for causing the condensed luminous flux L to scatter may be formed in the minute aperture 54 formed into a square shape. The minute scatterer 56 may be formed of a metallic material by deposition, film formation or the like on the end surface 40c so as to be situated at a substantially center position of the minute aperture 54. In this configuration, since the near field light R1 may be intensively localized near the minute scatterer 56, the recording at the higher density is achieved.

Third Embodiment

Figure 13:
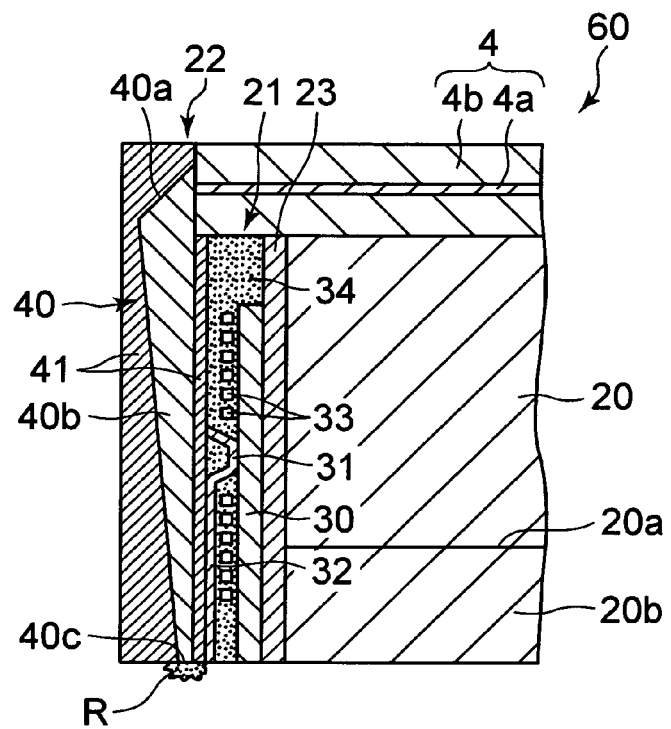
FIG. 13 is a cross-sectional view showing a third embodiment of the recording head according to the present invention.
Figure 14:
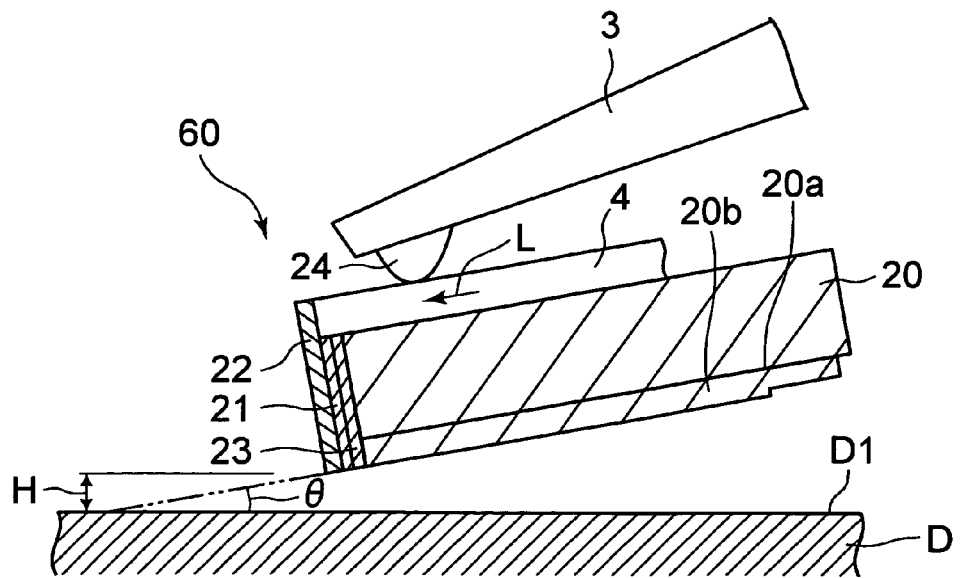
FIG. 14 is a drawing showing a state in which the recording head shown in FIG. 13 floats over the disk in an inclined state.

Referring now to FIG. 13 to FIG. 14, a third embodiment of a recording head according to the present invention will be described. In the third embodiment, the same components as those in the first embodiment are designated by the same reference numerals and description thereof is omitted.

A different point of the third embodiment from the first embodiment is that the recording element 21, the spot size converter 22, and the reproducing element 23 are fixed in sequence from the side surface of the slider 20 on the side of the outflow end thereof in the first embodiment, while the reproducing element 23, the recording element 21, and the spot size converter 22 are fixed in sequence from the side surface of the slider 20 on the side of the outflow end in a recording head 60 in the third embodiment.

In other words, the reproducing element 23 of the recording head 60 in this embodiment is provided between the side surface of the slider 20 on the side of the inflow end and the recording element 21 as shown in FIG. 13. Therefore, the spot size converter 22 and the recording element 21 are in a state of being moved toward the outflow end side of the slider 20 by an extent corresponding to the thickness of the reproducing element 23 in comparison with the case in the first embodiment.

Here, the posture of the slider 20 when being floated will be described further in detail. As shown in FIG. 14, the slider 20 is not horizontal with respect to the disk surface D1, but is slightly inclined. More specifically, it is inclined in such a manner that the angle θ between the disk surface D1 and the ABS of the slider 20 is maintained at a minute angle (for example, on the order of 1° to 5°) in a state in which the outflow end side gets close to the disk D. Therefore, the distance H from the disk surface D1 is gradually increased from the outflow end to the inflow end of the slider 20. In other words, the outflow end side of the slider 20 is in a state of being at the closest position to the disk surface D1.

Therefore, according to the recording head 60 in this embodiment, since the spot size converter 22 and the recording element 21 are closer to the outflow end of the slider 20, the spot size converter 22 and the recording element 21 may be brought closer to the disk surface D1 in comparison with the case of the first embodiment. Therefore, the spot light R and the recording magnetic field may be caused to act on the disc D with a high degree of efficiency, so that the higher density recording is achieved. Other effects and advantages are the same as the first embodiment.

Fourth Embodiment

Figure 15:
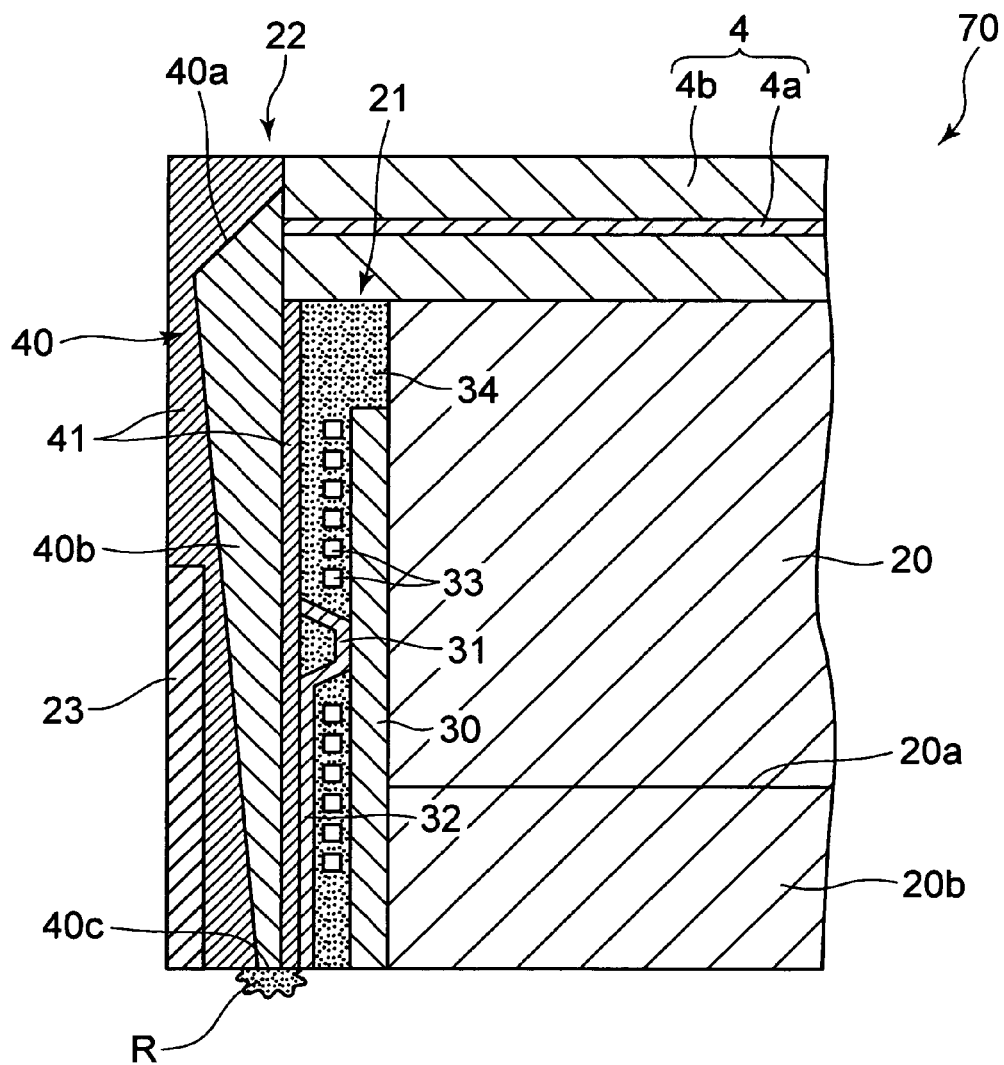
FIG. 15 is a cross-sectional view showing a fourth embodiment of the recording head according to the present invention.

Referring now to FIG. 15, a fourth embodiment of a recording head according to the present invention will be described. In the fourth embodiment, the same components as those in the first embodiment are designated by the same reference numerals and description thereof is omitted.

A different point of the fourth embodiment from the first embodiment is that the recording element 21, the spot size converter 22, and the reproducing element 23 are fixed in sequence from the side surface on the side of the outflow end of the slider 20 in the first embodiment, while the reproducing element 23 is provided in a state of being embedded in the clad 41 of the spot size converter 22 in a recording head 70 in the fourth embodiment.

In other words, the reproducing element 23 of the recording head 70 in this embodiment is embedded in a part of the clad 41 which confines the core 40 in the interior thereof as shown in FIG. 15. Therefore, the thickness of the reproducing element 23 is absorbed by the clad 41, and the spot size converter 22 and the recording element 21 may be brought closer to the outflow end side of the slider 20 in the same manner as the third embodiment. Therefore, when the slider 20 is inclined and is floated, the spot size converter 22 and the recording element 21 may be brought closer to the disk surface D1 in comparison with the case of the first embodiment. Therefore, the spot light R and the recording magnetic field may be caused to act on the disc D with a high degree of efficiency, so that the higher density recording is achieved. Other effects and advantages are the same as the first embodiment.

Fifth Embodiment

Figure 16:
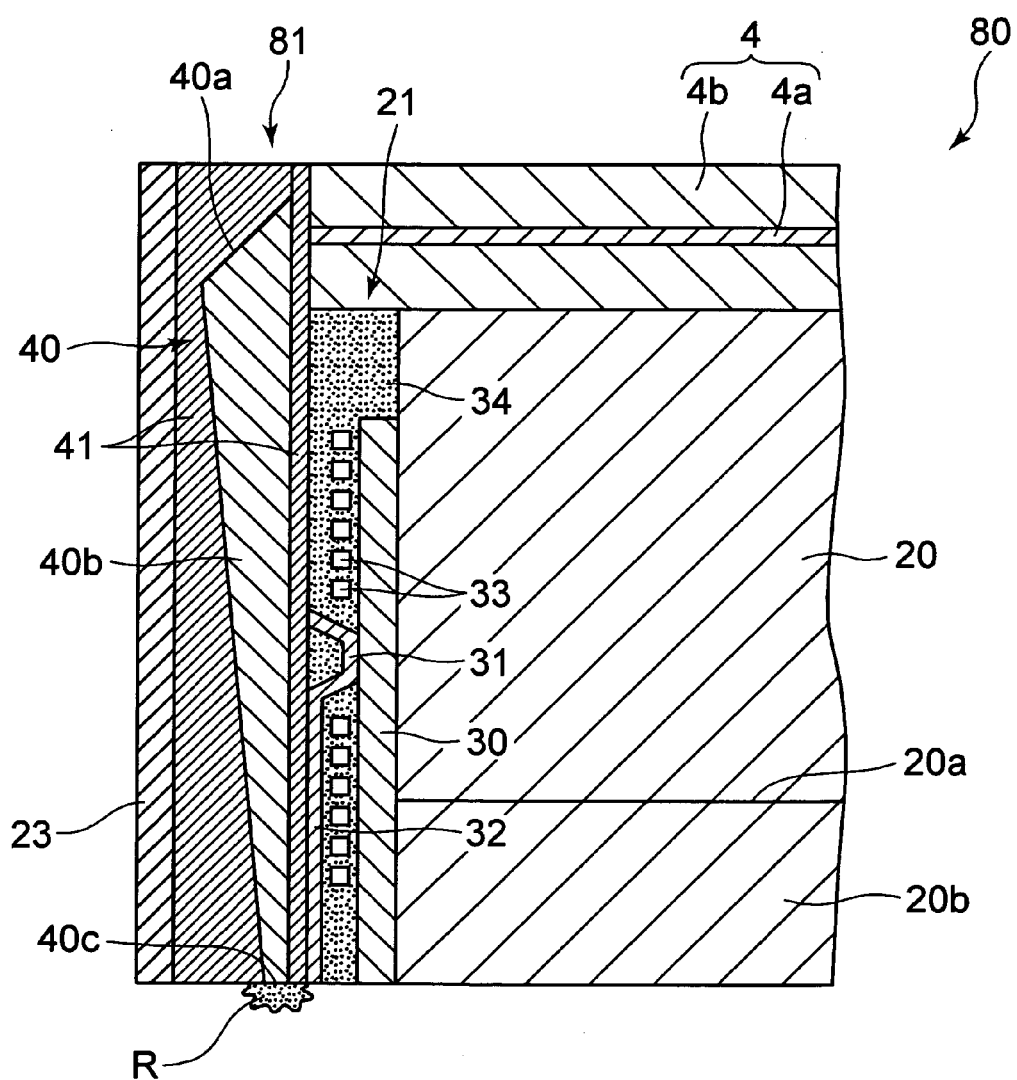
FIG. 16 is a cross-sectional view showing a fifth embodiment of the recording head according to the present invention.

Referring now to FIG. 16, a fifth embodiment of a recording head according to the present invention will be described. In the fifth embodiment, the same components as those in the first embodiment are designated by the same reference numerals and description thereof is omitted.

A different point of the fifth embodiment from the first embodiment is that the clad 41 is formed in the state in which the one end side of the core 40 is exposed to the outside in the first embodiment, while the one end side of the core 40 is covered with the clad 41 in a recording head 80 in the fifth embodiment.

In other words, the recording head 80 in this embodiment includes a spot size converter (spot light generating element) 81 in which the one end side of the core 40 is covered with the clad 41 as shown in FIG. 16. Therefore, the luminous flux L proceeding in the core 4a of the light guide 4 passes through the clad 41, and then is introduced into the core 40 of the spot size converter 81. In the case of this embodiment as well, the same effects and advantages as those in the first embodiment may be achieved. In addition, when manufacturing the spot size converter 81 in this embodiment, unlike the case of the first embodiment, it is not necessary to pattern the clad 41 in such a manner that the one end side of the core 40 is exposed. Therefore, it has advantages such that manufacture is easier, and manufacture is achieved with a higher degree of efficiency at a shorter time.

Sixth Embodiment

Figure 17:
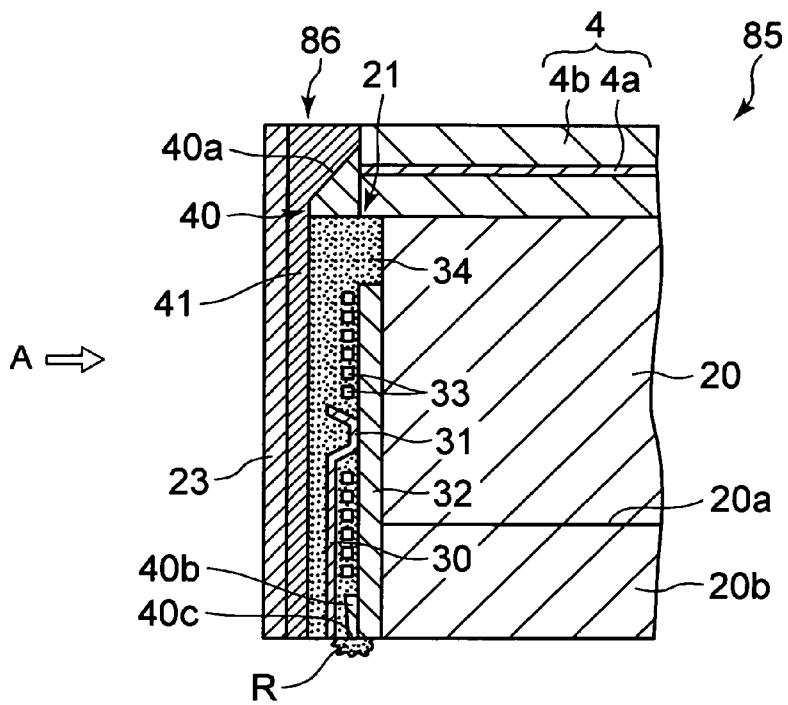
FIG. 17 is a cross-sectional view showing a sixth embodiment of the recording head according to the present invention.
Figure 18:
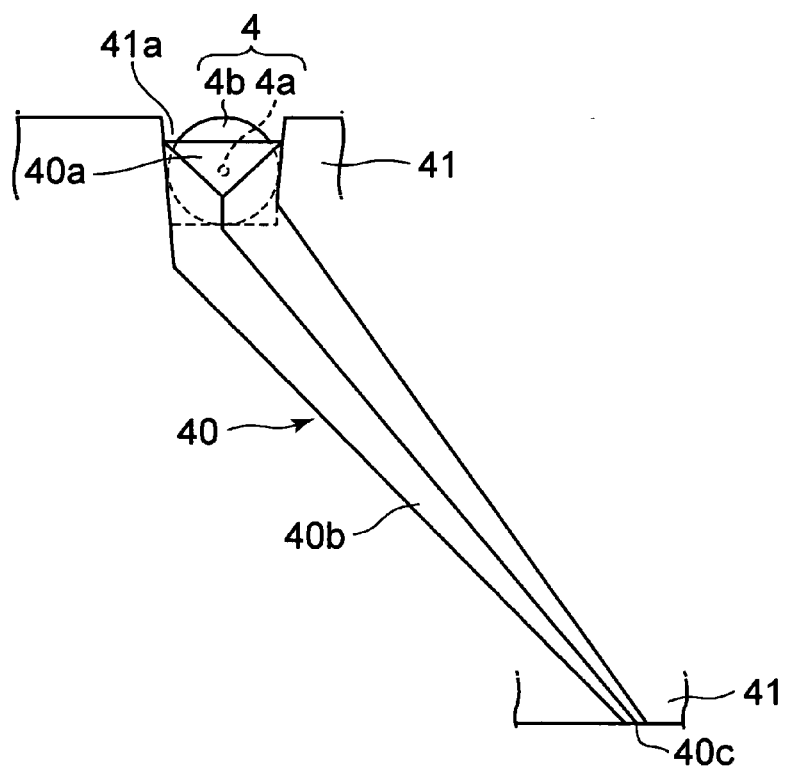
FIG. 18 is a drawing of a core of the spot light generating element shown in FIG. 17 viewed from a direction indicated by the arrow A.

Referring now to FIG. 17 and FIG. 18, a sixth embodiment of a recording head according to the present invention will be described. In the sixth embodiment, the same components as those in the first embodiment are designated by the same reference numerals and description thereof is omitted.

A different point of the sixth embodiment from the first embodiment is that the core 40 of the spot size converter 22 is formed rectilinearly right downward so as to extend substantially orthogonal to the opposed surface 20a of the slider 20 when viewed from the side of the outflow end of the slider 20 in the first embodiment, while the core 40 is formed obliquely so as to be inclined with respect to the opposed surface 20a in a recording head 85 in the sixth embodiment.

In other words, the recording head 85 in this embodiment includes a spot size converter (spot light generating element) 86 including the core 40 inclined obliquely from the one end side to the other end side when viewed from the outflow end side of the slider 20 as shown in FIG. 17 and FIG. 18. More specifically, the one end side of the core 40 is shifted in the lateral width direction of the slider 20 from the position in the first embodiment, and is formed obliquely from that position to the other end side. In the case of this embodiment, the position of the light guide 4 may be fixed in a state of being shifted in the lateral width direction of the slider 20 corresponding to the position of the core 40.

FIG. 18 is a drawing of the core 40 viewed in the direction of the arrow A in FIG. 17, that is, from the outflow end side of the slider 20. In FIG. 18, the clad 41 is shown only partly to make it easily viewable.

The recording element 21 and the spot size converter 86 in this embodiment are not adjacent in a completely independent state as in the first embodiment, but are in a partly overlapped state as shown in FIG. 17. In other words, the recording element 21 in this embodiment is formed so as to be arranged side by side with the core 40 formed in the state of being obliquely inclined.

Therefore, the spot size converter 86 and the recording element 21 may be brought closer to the outflow end side of the slider 20 in comparison with the first embodiment. Therefore, when the slider 20 is inclined and is floated, the spot size converter 86 and the recording element 21 may be brought closer to the disk surface D1 in comparison with the case of the first embodiment. Therefore, the spot light R and the recording magnetic field may be caused to act on the disc D with a high degree of efficiency, so that the higher density recording is achieved.

In addition, since the core 40 is formed obliquely, the entire length thereof (hereinafter referred to as core length) may be longer than the height of the slider 20. Therefore, the ratio of gradual reduction of the cross-sectional area may be reduced than in the first embodiment. Generally, when the cross-sectional area of the core 40 is abruptly reduced, the ratio of the luminous flux L leaked from the core 40 (the leaked light) is increased, so that the light propagation efficiency is lowered. However, according to the core 40 in this embodiment, since the ratio of the gradual reduction of the cross-sectional area may be reduced as described above, the light propagating ratio of the luminous flux L may be improved in comparison with the first embodiment. Therefore, the spot light R with a stronger light intensity may be generated, so that the recording at the higher density is achieved.

Other effects and advantages are the same as the first embodiment. In the case of this embodiment, in contrast to the case of the first embodiment, the recording element 21 may be configured in such a manner that the main magnetic pole 32 is positioned on the side of the slider 20, and the auxiliary magnetic pole 30 is positioned on the side of the spot size converter 86.

Seventh Embodiment

Figure 19:
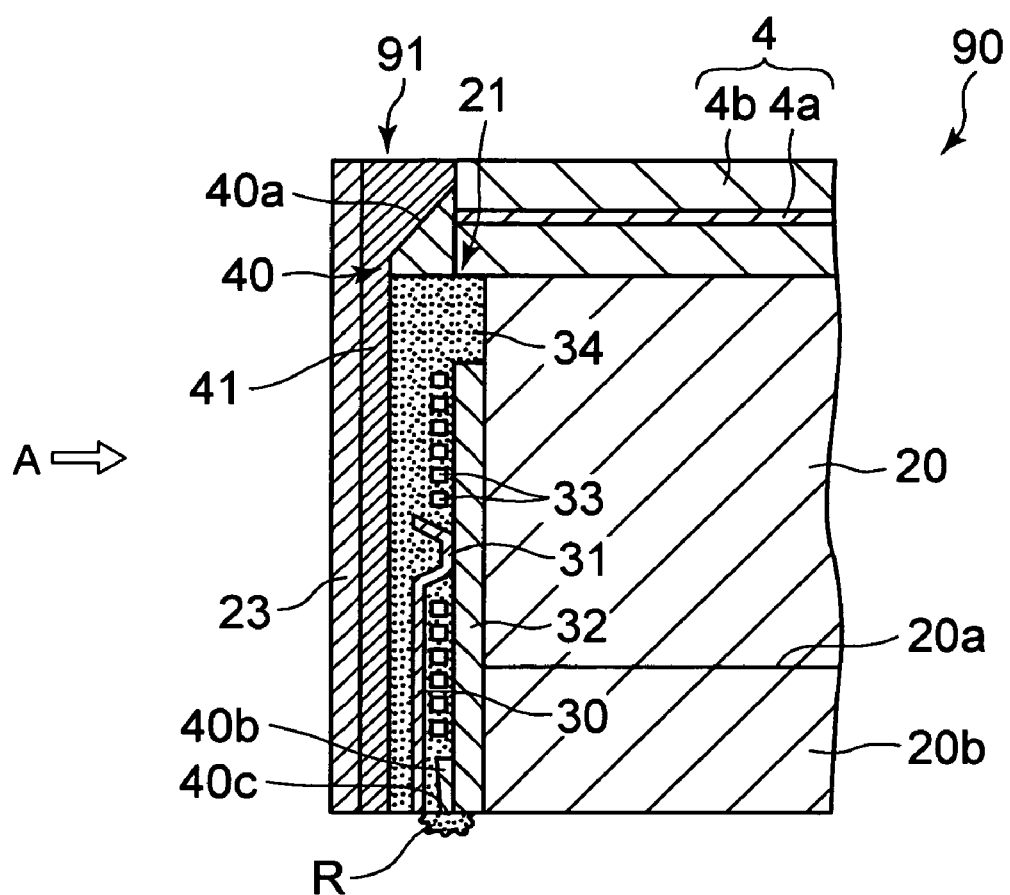
FIG. 19 is a cross-sectional view showing a seventh embodiment of the recording head according to the present invention.
Figure 20:
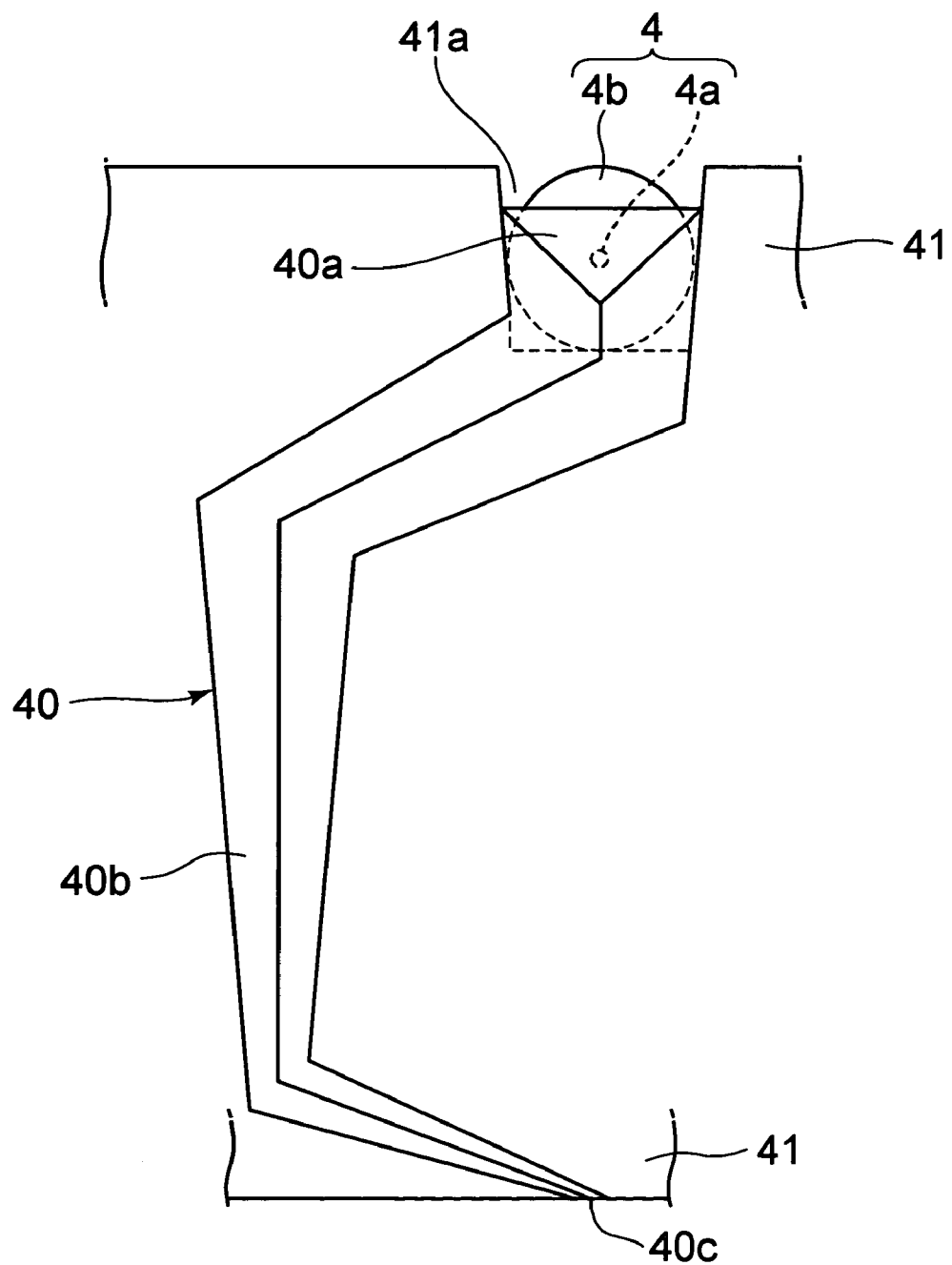
FIG. 20 is a drawing of a core of the spot light generating element shown in FIG. 19 viewed from a direction indicated by the arrow A.

Referring now to FIG. 19 and FIG. 20, a seventh embodiment of a recording head according to the present invention will be described. In the seventh embodiment, the same components as those in the first embodiment are designated by the same reference numerals and description thereof is omitted.

A different point of the seventh embodiment from the first embodiment is that the core 40 of the spot size converter 22 is formed rectilinearly when viewed from the side of the outflow end of the slider 20 in the first embodiment, while the core 40 is curved in a recording head 90 in the seventh embodiment.

In other words, the recording head 90 in this embodiment includes a spot size converter (spot light generating element) 91 including the core 40 curved from the one end side to the other end side when viewed from the outflow end side of the slider 20 as shown in FIG. 19 and FIG. 20. More specifically, the one end side and the other end side of the core 40 are located at the same position as the first embodiment, and only a path extending from the one end side to the other end side is bent at several points.

FIG. 20 is a drawing of the core 40 viewed in the direction of the arrow A in FIG. 19, that is, from the outflow end side of the slider 20. In FIG. 20, the clad 41 is shown only partly to make it easily viewable.

The recording element 21 and the spot size converter 91 in this embodiment are not adjacent in a completely independent state as in the first embodiment, but are in a partly overlapped state as shown in FIG. 19. In other words, the recording element 21 in this embodiment is formed so as to enter the area of the core 40 which is curved in a midsection thereof. In other words, the core 40 is formed so as to avoid the recording element 21 in order to prevent the interference with the recording element 21.

Therefore, in comparison with the first embodiment, the spot size converter 91 and the recording element 21 may be brought closer to the outflow end side of the slider 20. Therefore, when the slider 20 is inclined and is floated, the spot size converter 91 and the recording element 21 may be brought closer to the disk surface D1 in comparison with the case of the first embodiment. Therefore, the spot light R and the recording magnetic field may be caused to act on the disc D with a high degree of efficiency, so that the higher density recording is achieved. Other effects and advantages are the same as the first embodiment.

In the case of this embodiment, in contrast to the case of the first embodiment, the recording element 21 may be configured in such a manner that the main magnetic pole 32 is positioned on the side of the slider 20, and the auxiliary magnetic pole 30 is positioned on the side of the spot size converter 91.

Figure 21:
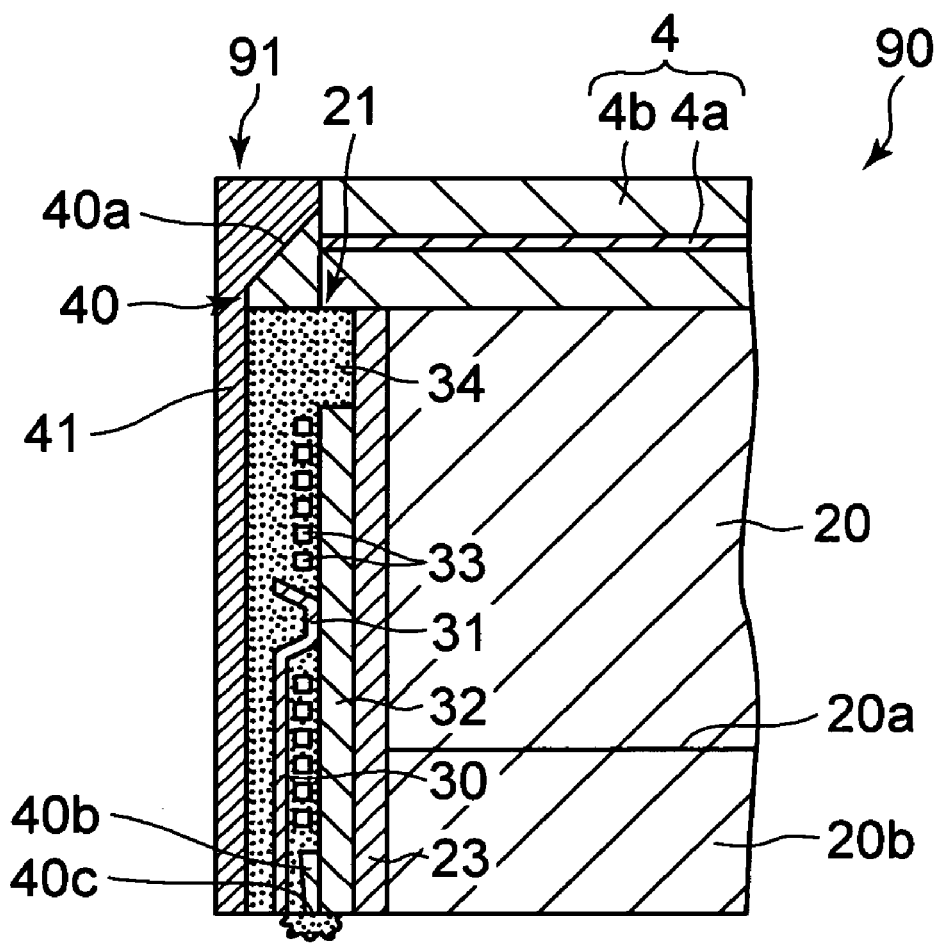
FIG. 21 is a drawing showing a modification of the recording head shown in FIG. 19, and showing the recording head in which a reproducing element is provided between a slider and the recording element.
Figure 22:
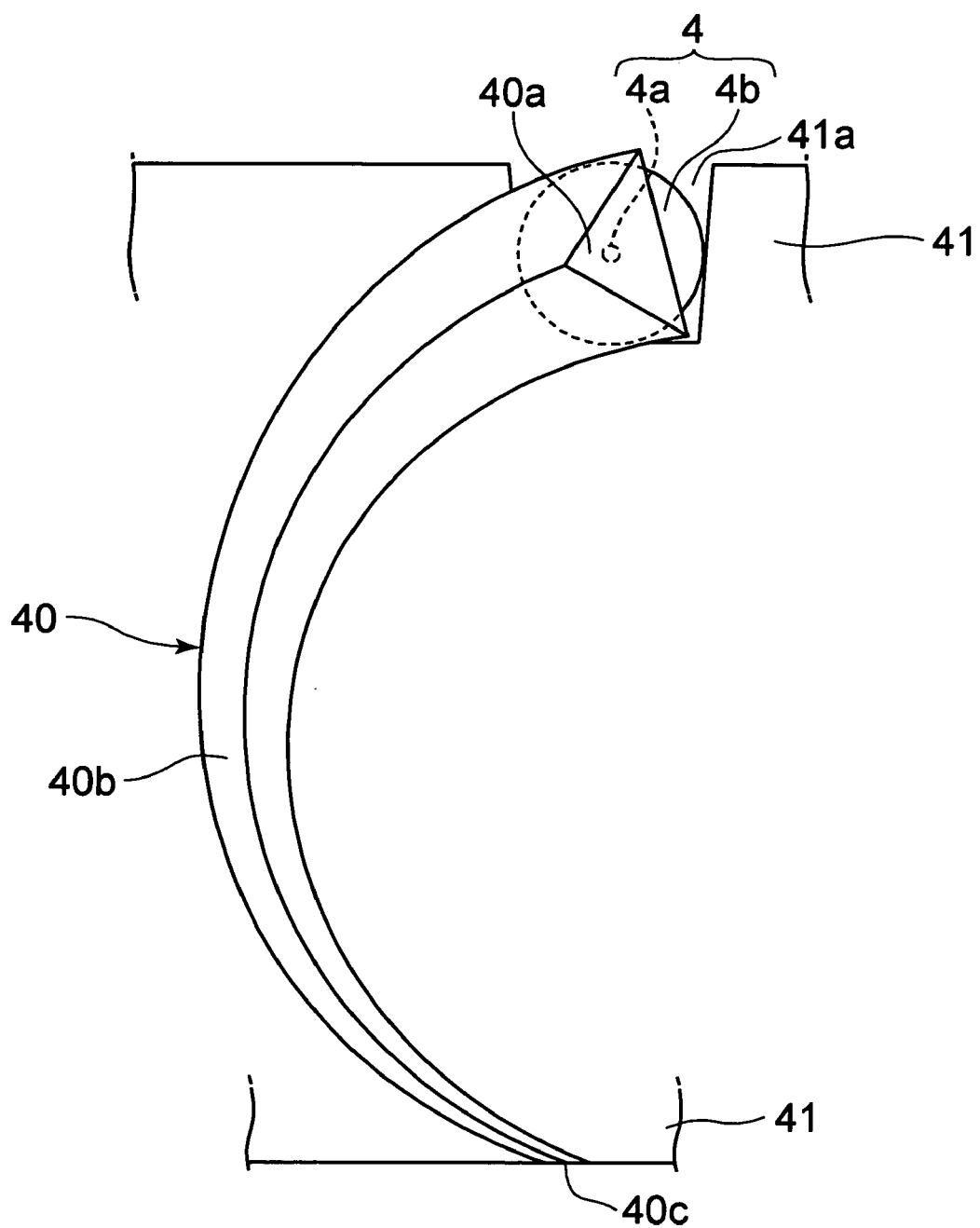
FIG. 22 is a drawing showing a modification of the recording head shown in FIG. 19, and showing the recording head having a spot size converter in which the core is smoothly curved.

In the seventh embodiment described above, as shown in FIG. 21, the reproducing element 23 may be provided between the side surface on the outflow end of the slider 20 and the recording element 21. In this configuration, it is more preferable because the spot size converter 91 and the recording element 21 may be brought closer to the outflow end side of the slider 20. Although the core 40 is curved by bending the core 40 in the midsection from the one end side to the other end side at the several points in the seventh embodiment described above, it is also applicable to bend the same smoothly without generating a bent position as shown in FIG. 22. In this configuration, it is further preferable because the luminous flux L may be propagated in the state in which the loss is further reduced.

Even in the case of the core 40 shown in FIG. 19 to FIG. 22, since the core length is increased as in the sixth embodiment, the same effects and advantages are achieved. In other words, the spot light R with a stronger light intensity may be generated, so that the recording at the higher density is achieved.

Eighth Embodiment

Figure 23:
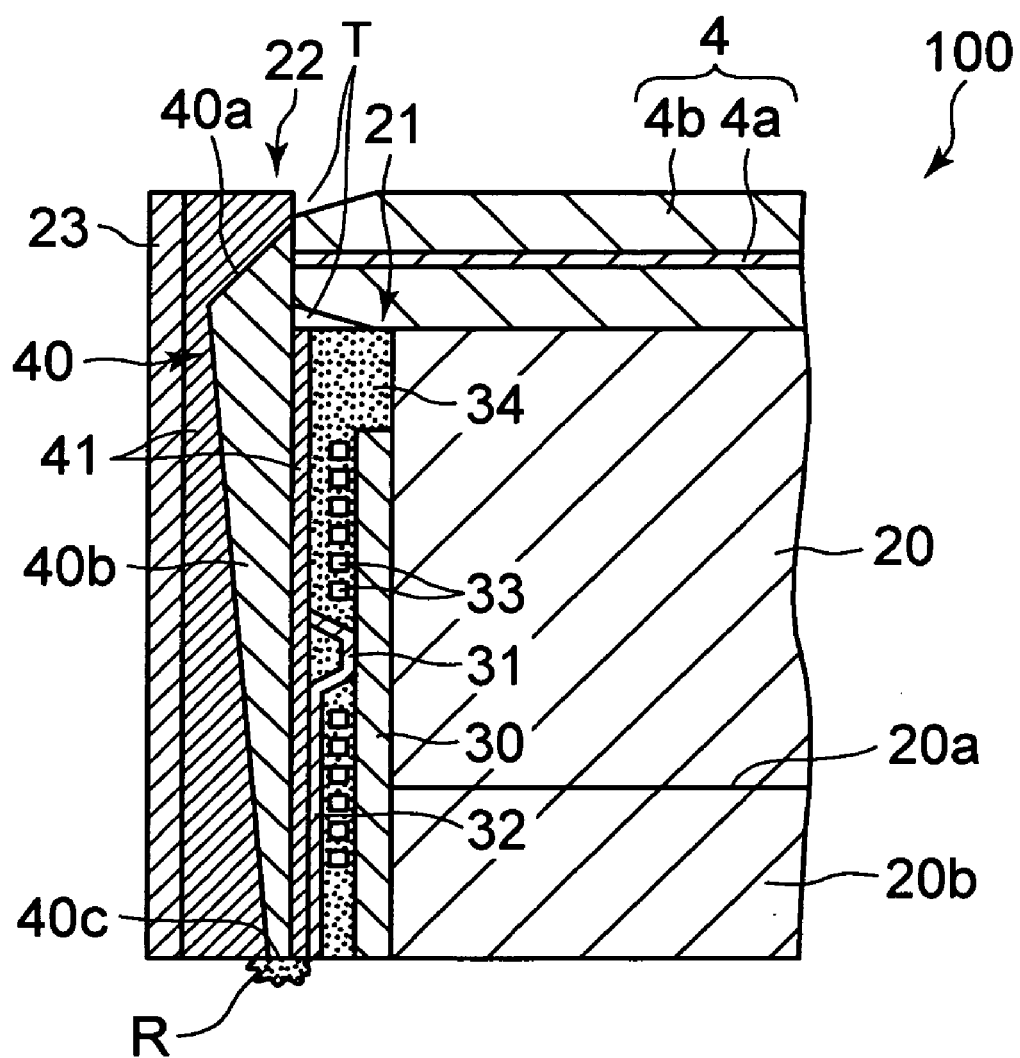
FIG. 23 is a cross-sectional view showing an eighth embodiment of the recording head according to the present invention.

Referring now to FIG. 23, an eighth embodiment of a recording head according to the present invention will be described. In the eighth embodiment, the same components as those in the first embodiment are designated by the same reference numerals and description thereof is omitted.

A different point of the eighth embodiment from the first embodiment is that the clad 4b of the light guide 4 has the same shape from a proximal end side to be connected to the optical signal controller 5 to a distal end side to be connected to the spot size converter 22 in the first embodiment, while a recording head 100 in the eighth embodiment is provided with the light guide 4 formed with a notched portion T on a distal end side of the clad 4b.

In other words, the clad 4b of the light guide 4 in this embodiment is cut obliquely and the outer diameter is reduced along the entire circumference on a distal end side to be connected to the core 40 of the spot size converter 22 as shown in FIG. 23. Then, a space formed by the cut portion corresponds to the above-described notched portion T.

Here, as a procedure to mount the light guide 4, first of all, an adhesive agent, not shown, is applied on the periphery of the clad 4b. Subsequently, the light guide 4 applied with the adhesive agent is fitted to the groove portion 41a formed on the clad 41 of the spot size converter 22 and a groove portion, not shown, formed on an upper surface of the slider 20 and fixed firmly. Then, the adhesive agent is cured finally, so that mounting of the light guide 4 is ended.

Incidentally, there is a case after having fitted the light guide 4 applied with the adhesive agent, the adhesive agent might enter an interface between the core 4a of the light guide 4 and the core 40 of the spot size converter 22 by capillary phenomenon or the like. When the adhesive agent enters provisionally, the luminous flux L introduced from the light guide 4 to the core 40 is adversely affected, so that the loss of light might be resulted.

However, in this embodiment, since the notched portion T is formed on the light guide 4, the adhesive agent is trapped in the notched portion T before entering the interface between the core 4a of the light guide 4 and the core 40 of the spot size converter 22. Therefore, the above-described inconvenience may be prevented.

Although the notched portion T is formed by obliquely cutting along the entire circumference of the clad 41 in this embodiment, the invention is not limited thereto, and the notched portion T may be formed by cutting at least only one point of the clad 41 on a distal end side.

The technical scope of the present invention is not limited to the embodiments described above, and various modifications may be made without departing the scope of the present invention.

For example, although the case where the data recording and reproducing apparatus of the air floating type in which the recording head is floated is exemplified in the respective embodiments described above, the invention is not limited to this case, and the disc and the slider may be in contact with each other as long as it is arranged so as to oppose the disc surface. In other words, the recording head according to the present invention may be a head of a contact slider type. In this case as well, the same effects and advantages may be achieved.

INDUSTRIAL APPLICABILITY

According to the recording head in the present invention, the spot light may be generated by condensing the luminous flux with a high degree of efficiency, so that the writing reliability is improved. Also, a compact design and reduction in thickness are achieved.

According to the data recording and reproducing apparatus in the present invention, since the recording head as described above is provided, the writing reliability is high, and the high density recording is supported, whereby the high quality is achieved. Also, simultaneously, a compact design and reduction in thickness are achieved.

The invention claimed is:

1. A recording head configured to record data by heating a magnetic recording medium, while it rotates in a constant direction, by a spot light generated by condensing a luminous flux and causing a flux reversal by providing a recording magnetic field in the vertical direction with respect to the magnetic recording medium, the recording head comprising;

a slider arranged so as to oppose a surface of the magnetic recording medium;

a recording element fixed to a distal end surface of the slider and having a main magnetic pole and an auxiliary magnetic pole for generating the recording magnetic field;

a spot light generating element including a core having a reflecting surface configured to reflect the luminous flux introduced from one end side to the other end side in a direction different from the direction of introduction, and a luminous flux condensing unit having a cross-sectional area orthogonal to a direction from the one end side to the other end side that gradually reduces in size and being configured to generate the spot light by propagating the reflected luminous flux toward the other end side while condensing the same and emitting the spot light from the other end side toward an outside, and a clad formed of a material having a lower index of refraction than that of the core and configured to confine the core in the interior thereof by being in tight contact with a side surface of the core while exposing the other end side of the core to the outside, the spot light generating element being fixed adjacently to the recording element in a state in which the other end side is directed toward the magnetic recording medium; and luminous flux introducing means fixed to the slider in a state of being parallel to the slider for introducing the luminous flux into the core from the one end side, wherein the luminous flux condensing unit generates the spot light in the vicinity of the main magnetic pole.

2. The recording head according to claim 1; wherein the clad is formed in a state of exposing one end side of the core to the outside.

3. The recording head according to claim 1; wherein the luminous flux condensing unit includes a near field light generating element configured to generate a near field light from the spot light and emit the near field light from the other end side to the outside.

4. The recording head according to claim 1; further including a reproducing element configured to output an electric signal according to the magnitude of a magnetic field leaked from the magnetic recording medium.

5. The recording head according to claim 4; wherein the reproducing element is provided between the slider and the recording element.

6. The recording head according to claim 4; wherein the reproducing element is embedded in the clad.

7. A data recording and reproducing apparatus comprising:
a recording head according to claim 4;
a beam configured to be movable in a direction parallel to a surface of the magnetic recording medium and support the recording head at a distal end side in a state of being rotatable about two axes extending in parallel to the surface of the magnetic recording medium and being orthogonal to each other;
a light source configured to produce and direct the luminous flux to the luminous flux introducing means;
an actuator configured to support a proximal end side of the beam and move the beam toward the direction parallel to the surface of the magnetic recording medium;
a rotation driving unit configured to rotate the magnetic recording medium in the constant direction; and
a control unit configured to control operations of the recording element and the light source.

* * * * *